(12) United States Patent
Johnson, Jr.

(10) Patent No.: US 9,964,030 B1
(45) Date of Patent: May 8, 2018

(54) TETHERED PISTON ENGINE

(71) Applicant: Nolton C. Johnson, Jr., Bend, OR (US)

(72) Inventor: Nolton C. Johnson, Jr., Bend, OR (US)

(*) Notice: Subject to any disclaimer, the term of this patent is extended or adjusted under 35 U.S.C. 154(b) by 0 days. days.

(21) Appl. No.: 15/261,658

(22) Filed: Sep. 9, 2016

(51) Int. Cl.
| | | |
|---|---|---|
| *F02B 69/00* | (2006.01) | |
| *F02B 61/06* | (2006.01) | |
| *F02B 75/18* | (2006.01) | |
| *F16H 19/06* | (2006.01) | |

(52) U.S. Cl.
CPC .............. *F02B 69/00* (2013.01); *F02B 61/06* (2013.01); *F02B 75/18* (2013.01); *F02B 2075/1808* (2013.01); *F16H 19/06* (2013.01); *F16H 2019/0686* (2013.01)

(58) Field of Classification Search
CPC .......... F02B 69/00; F02B 75/18; F02B 61/06; F02B 2075/1808; F02B 75/20; F16H 2019/0686; F16H 19/06; Y10T 74/18152; Y10T 74/18848; Y10T 74/18832; Y10T 74/1884; F01B 1/12
USPC .... 123/55.7, 53.3–53.6, 197.1, 197.5, 197.2, 123/197.4, 197.3, 46 A, 78 BA
See application file for complete search history.

(56) References Cited

U.S. PATENT DOCUMENTS

| | | | |
|---|---|---|---|
| 1,399,666 A * | 12/1921 | Short | F01B 9/026 123/55.7 |
| 2,501,053 A | 3/1950 | Hooker | |
| 2,501,056 A | 3/1950 | Kalitinsky | |
| 3,072,114 A | 1/1963 | Colgate | |
| 3,673,991 A | 7/1972 | Winn | |
| 3,745,887 A | 7/1973 | Striegl | |
| 3,853,100 A | 12/1974 | Braun | |

(Continued)

FOREIGN PATENT DOCUMENTS

| | | |
|---|---|---|
| CN | 86205979 U | 6/1987 |
| CN | 2037780 U | 5/1989 |

(Continued)

OTHER PUBLICATIONS

"The Beetron Concept—Presentation of the Technology Carrier Prototype," You Tube video by Beetron Power Generation, published Oct. 15, 2014, 15 pages, accessed from https://www.youtube.com/watch?v=Mpi22ImD0dk on Aug. 23, 2016.

(Continued)

*Primary Examiner* — Stephen K Cronin
*Assistant Examiner* — Carl Staubach

(57) ABSTRACT

A system including a combustion engine is disclosed. The combustion engine includes a first cylinder orientated along a first axis. The combustion engine also includes a first piston, fitted within the first cylinder, to move in reciprocating motion by alternately moving in a first linear direction along the first axis responsive to a first power stroke or a second linear direction along the first axis responsive to a second power stroke. The combustion engine includes a tensile band affixed to a first end and a second end of the first piston. The first piston is to exert a first tensile force on the tensile band in the first linear direction in response to the first power stroke. The first piston is to exert a second tensile force on the tensile band in the second linear direction in response to the second power stroke.

16 Claims, 13 Drawing Sheets

(56) References Cited

U.S. PATENT DOCUMENTS

| | | | |
|---|---|---|---|
| 3,868,932 A * | 3/1975 | Toth | F01B 9/026 123/197.1 |
| 4,227,421 A * | 10/1980 | Weishew | B65H 54/2821 188/72.4 |
| 4,480,611 A | 11/1984 | Wendt | |
| 4,876,991 A | 10/1989 | Galitello, Jr. | |
| 4,907,548 A * | 3/1990 | Lee | F01B 9/047 123/197.3 |
| 4,915,019 A * | 4/1990 | Hovaguimian | F01B 7/04 74/131 |
| 4,924,956 A | 5/1990 | Deng et al. | |
| 4,941,396 A * | 7/1990 | McCabe | F01B 9/047 123/55.3 |
| 4,966,000 A | 10/1990 | Wolters | |
| 5,025,756 A | 6/1991 | Nyc | |
| 5,105,094 A * | 4/1992 | Parker | F03B 13/148 290/42 |
| 5,396,868 A * | 3/1995 | Solomon | F02B 75/243 123/197.1 |
| 5,427,507 A | 6/1995 | Whitehead | |
| 5,535,715 A * | 7/1996 | Mouton | F01B 9/047 123/197.1 |
| 5,640,881 A * | 6/1997 | Brackett | F01B 9/023 123/55.3 |
| 5,673,665 A * | 10/1997 | Kim | F01B 9/08 123/197.1 |
| 5,782,213 A * | 7/1998 | Pedersen | F01B 9/026 123/197.4 |
| 5,934,229 A * | 8/1999 | Li | F01B 9/023 123/192.2 |
| 6,148,716 A * | 11/2000 | Swank | F01B 1/08 92/137 |
| 6,223,612 B1 * | 5/2001 | Massinger | F16H 25/12 123/53.4 |
| 6,553,966 B2 | 4/2003 | Cornell et al. | |
| 6,957,631 B2 | 10/2005 | Jacobsen et al. | |
| 6,971,339 B2 | 12/2005 | Janssen | |
| 6,971,341 B1 | 12/2005 | Fuqua et al. | |
| 6,983,724 B2 | 1/2006 | Carlson | |
| 7,076,950 B2 | 7/2006 | Klostermann | |
| 7,360,521 B2 | 4/2008 | Raether | |
| 7,387,093 B2 | 6/2008 | Klacsi | |
| 8,074,619 B2 * | 12/2011 | Harju | F01B 1/08 123/197.1 |
| 8,260,530 B2 | 9/2012 | Rollinger et al. | |
| 8,392,096 B2 | 3/2013 | Mathews et al. | |
| 8,447,502 B2 | 5/2013 | Rollinger et al. | |
| 8,511,204 B2 | 8/2013 | Harju | |
| 8,800,510 B2 | 8/2014 | Carlson et al. | |
| 2001/0017111 A1 * | 8/2001 | Hanson | F02B 61/045 123/55.5 |
| 2004/0261750 A1 * | 12/2004 | McKeown | F01B 9/047 123/197.1 |
| 2005/0247273 A1 | 11/2005 | Carlson | |
| 2006/0169244 A1 | 8/2006 | Allen | |
| 2006/0196455 A1 | 9/2006 | Jones et al. | |
| 2011/0044828 A1 * | 2/2011 | Lund | F04B 9/06 417/362 |
| 2012/0312654 A1 * | 12/2012 | Kim | F16D 27/112 192/48.2 |
| 2013/0247877 A1 | 9/2013 | Waggott | |
| 2013/0269634 A1 * | 10/2013 | Rez | F02B 75/32 123/41.37 |
| 2014/0290616 A1 | 10/2014 | Han | |
| 2017/0009884 A1 * | 1/2017 | Muckenhirn | F16J 1/14 |

FOREIGN PATENT DOCUMENTS

| | | |
|---|---|---|
| CN | 1172083 A | 10/2004 |
| CN | 200946527 Y | 9/2007 |
| CN | 103670696 A | 3/2014 |
| DE | 19945873 A1 | 9/2000 |
| EP | 1793104 A1 | 6/2007 |
| EP | 2594763 A2 | 5/2013 |
| WO | WO2003006794 | 1/2003 |
| WO | WO2004020869 A1 | 3/2004 |
| WO | WO2007040599 A1 | 4/2007 |
| WO | WO2007095838 A1 | 8/2007 |
| WO | WO2011077178 A1 | 6/2011 |
| WO | WO2011083347 A1 | 7/2011 |
| WO | WO2014028782 A2 | 2/2014 |

OTHER PUBLICATIONS

"What is a free piston engine," Libertine FPE, 1 page, downloaded from http://www.libertine.co.uk/what-is-a-free-piston-engine on Aug. 23, 2016.

"Free-piston engine," Wikipedia, the free encyclopedia, 5 pages, downloaded from httpd://en.wikipedia.org/wiki/Free-piston_engine on Aug. 23, 2016.

* cited by examiner

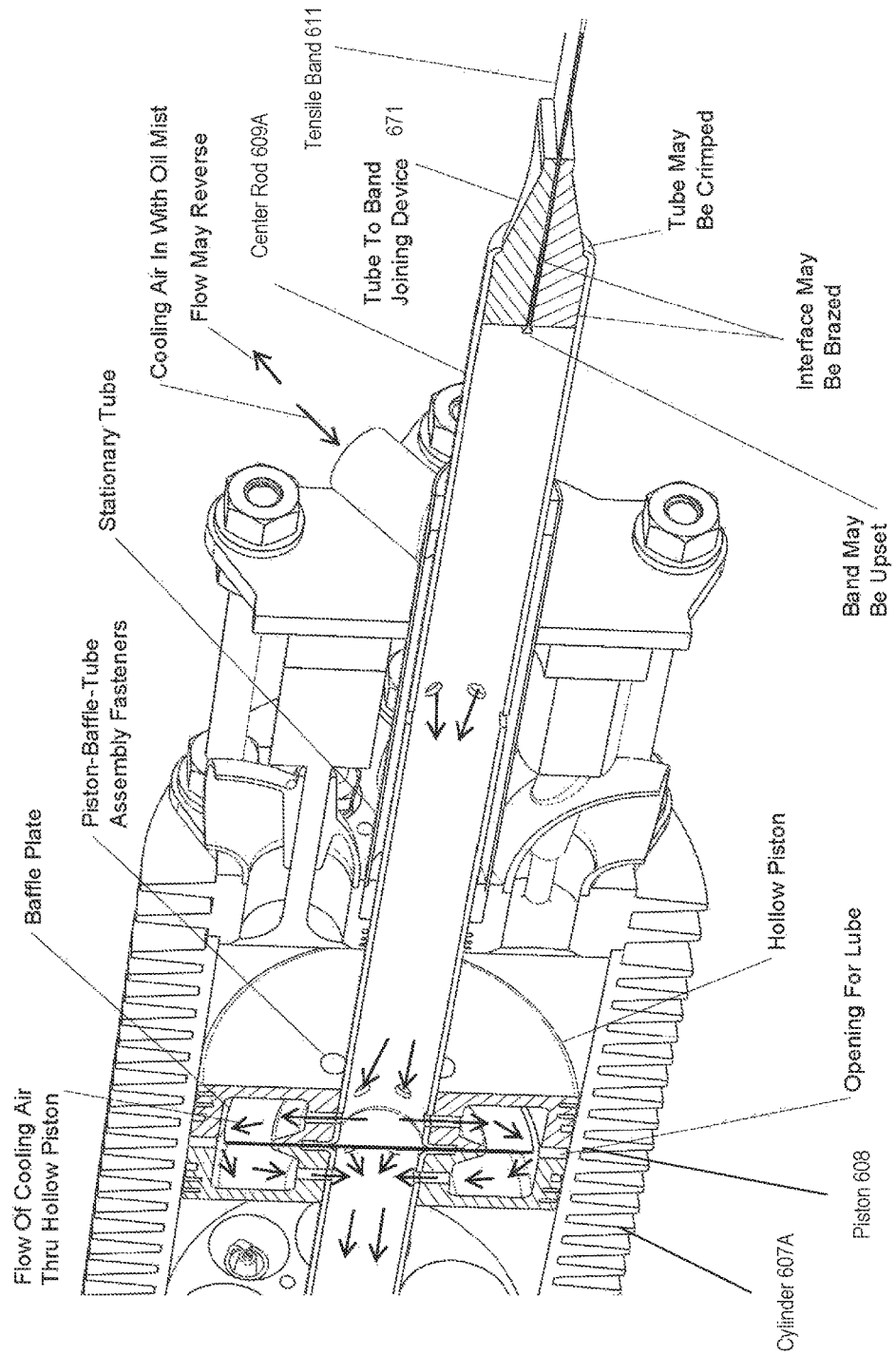

TETHERED PISTON ENGINE

TECHNICAL FIELD

Implementations of the present invention relate to the field of engines and, in particular, to internal combustion engines.

BACKGROUND

An internal combustion engine (ICE) is a heat engine where the combustion of a fuel, such as gasoline, natural gas, propane, or oil, occurs with an oxidizer, such as air, in a combustion chamber (also referred to as a combustion event). The combustion of fuel causes expansion gases produced by the combustion event to apply a force to components, such as pistons, turbine blades, rotors, among others, of the internal combustion engine. Internal combustion engine may refer to an engine in which combustion is intermittent, such as two-stroke or four stroke piston engines, among others. In a four-stroke piston engine, the four strokes include an intake stroke, a compression stroke, a power (combustion) stroke, and an exhaust stroke. For example, the intake stroke introduces an air and fuel mixture into the combustion chamber, such as a cylinder. The air and fuel mixture may be forced through an open intake valve into the cylinder. The compression stroke compresses the air and fuel mixture inside the cylinder by the movement of a piston. The power stroke may begin from an ignition event. For example, the compressed air and fuel mixture (i.e., charge) inside the cylinder is ignited and is rapidly oxidized through a chemical reaction to release heat. Hot expanding gases from combustion (also referred to as combustion gasses) force the piston head away from the cylinder head. Piston force is transferred through a connecting rod to apply torque to the crankshaft. The reciprocating motion of the piston is translated to rotary motion by turning the crankshaft. The exhaust stroke expels gasses from the combustion chamber. The exhaust stroke may occur when the exhaust valve is open and the intake valve is closed. Piston movement may evacuate the gasses from the combustion chamber.

BRIEF DESCRIPTION OF THE DRAWINGS

The present invention is illustrated by way of example, and not by way of limitation, in the figures of the accompanying drawings.

FIG. 6B illustrates magnified view of a cross section of a tethered piston engine, in accordance with some implementations of the disclosure.

DETAILED DESCRIPTION

Figure 1:
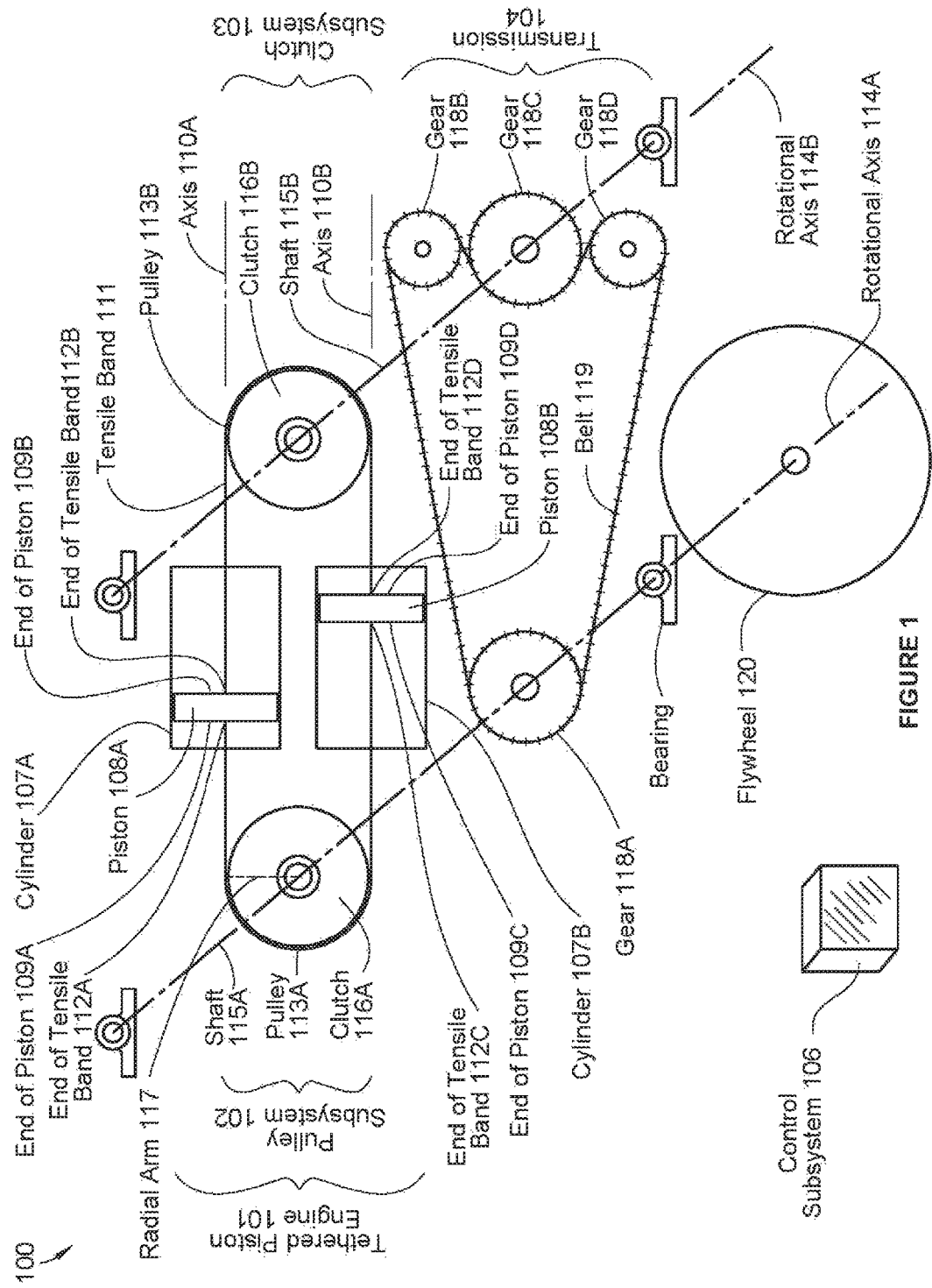
FIG. 1 illustrates a system diagram of a tethered piston engine, in accordance with some implementations of the disclosure.

The internal combustion engine has become ubiquitous in industrialized society. Internal combustion engines power and propel aircraft, ships, automobiles, locomotives, industrial equipment, and machinery, for example. The automobile combustion engine, herein after automobile engine, may be one type of internal combustion engine. Some automobile engines may consist of one or more cylinders where each cylinder contains a piston. A piston may be connected to a crankshaft via a wrist pin and a connecting rod. A piston may reciprocate within the cylinder to rotate a crankshaft. A camshaft controls the operation of the engine valves to facilitate fuel intake and exhaust outtake, for example. Automobile engines are far from perfectly efficient. The crankshaft, connecting rods, and wrist pins are designed with considerable mass to withstand the large compressive forces of a moving piston. Some of the inefficiency of some automobile engines is due to energy loss from moving the mass of the crankshaft, connecting rods, wrist pins, and camshaft. In some automobile engines, the angle between the connecting rod and the crank radius (e.g., crank angle) is not maintained at 90 degrees throughout the power stroke which creates a non-ideal and inefficient transfer of force. In some automobile engines that implement a crankshaft, connecting rods, and wrist pins, pistons may be designed with additional mass to compensate for side loading of a cylinder wall. Additionally, some automobile engines may continue to run when a vehicle is not in motion (i.e., idle) and continue to consume fuel contributing to the engine's inefficiency.

The present disclosure addresses the above-mentioned and other deficiencies by disclosing a combustion engine (also referred to as a tethered piston engine (TPE) with a cylinder orientated along a first axis. A piston is fitted within the cylinder and moves in a reciprocating motion within cylinder. A tensile band is connected or tethered in a loop to the first end and the second end of the piston. During a power stroke in a first direction along the first axis, the piston transfers energy (e.g., tensile force) of the first power stroke by pulling the tensile band connected to the first end. During the first power stroke, fuel may be compressed on the other side (e.g., second end) of the piston to set up a second power stroke. During the second power stroke, the piston moves in a second direction along the first axis. The piston transfers energy of the second power stroke by pulling the tensile band connected to the second end in the second direction. The tensile band may be held in tension in a loop by a pulley subsystem where the angle between the tensile band (and the linear motion of the piston) and a radius of a pulley is maintained at substantially 90 degrees during the power stroke.

In one implementation, the tethered piston engine includes a cylinder orientated along an axis. A piston with a first end and a second end is fitted in the cylinder to move in a reciprocating motion along the axis. The piston may have a first end and a second end on opposite sides of the piston. The piston may perform a first power stroke in a first linear direction along the axis. The piston may also perform a second power stroke in a second opposite linear direction along the axis. The first end and second end of the piston may be attached to a tensile band that is held in tension in a loop by a pulley subsystem. The pulley subsystem may include a first pulley and a second pulley to hold the tensile band in a tight loop that will not slack under combustion load or temperature change. The pulley subsystem may also help translate the reciprocal motion of the piston into rotational motion. In response to the first power stroke, the piston moves in the first linear direction and pulls (e.g., exerts a tensile force) on the tensile band in the first direction to turn the first pulley. The piston moving in the first linear direction responsive to first power stroke, may also compress an air and fuel mixture on the opposite side of the piston (e.g., compression stroke). When the air and fuel mixture is ignited on the opposite side of the piston, the second power stroke is performed in the opposite direction (e.g., second linear direction) along the axis. The second power stroke pulls the tensile band in the opposite direction to turn the second pulley. The first pulley may be connected to a first shaft that rotates about a first rotational axis. The second pulley may be connected to a second shaft that rotates about a second rotational axis. During the first power stroke, a clutch subsystem may be used to engage the first pulley with first shaft and disengage the second pulley from the second shaft. With the use of the clutch subsystem, the tensile force generated from the piston during the first power stroke is translated to torque that rotates the first shaft but not the second shaft. During the second power stroke, the clutch subsystem may be used to disengage the first pulley with the first shaft and engage the second pulley with the second shaft. With the use of the clutch system, the tensile force generated from the piston during the second power stroke is translated to torque that rotates the second shaft but not the first shaft. The first shaft in response to the first power stroke may rotate in a first direction. The second shaft responsive to the second power stroke may rotate in a second and opposite direction. A transmission subsystem may be used to translate the rotary motion of the first shaft in a first direction and the rotary motion of the second shaft in the second and opposite direction into a single direction about a rotational axis.

Accordingly, aspects of the present disclosure allow for an efficient combustion engine that incorporates a piston that is connected to a lightweight tensile band to translate tensile forces of the piston into rotary motion. The tethered piston engine may not implement a crankshaft, connecting rod, or wrist pins. The tensile forces applied to the tensile band during a power stroke, rather than compressive forces of power strokes of some other combustion engines, allow the tensile band to be a lighter weight than functionally comparative components such as a crankshaft, connecting rod, and wrist pin. Using a tensile band may decrease the weight of the tethered piston engine and increase efficiency, among other advantages.

Implementations described herein are discussed with respect to an automobile combustion engine for purposes of illustration rather than limitation. However, it may be noted that the present disclosure may apply to any type of internal combustion engine, or other applications such as pumps (e.g., aircraft, watercraft, stationary, or portable pumps), compressors, or generators.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

FIG. 1 illustrates a system diagram of a tethered piston engine, in accordance with some implementations of the disclosure. Engine system 100 shows a tethered piston engine 101, pulley subsystem 102, clutch subsystem 103, transmission 104, flywheel 120, and control subsystem 106.

Tethered piston engine 101 includes cylinder 107A and 107B. Two cylinders are shown for purposes of illustration rather than limitation. It may be noted that although two cylinders are shown for purposes of illustration, rather than limitation, in other implementations, one or more cylinders may be implemented. Each cylinder 107 includes a piston 108 that is fitted within cylinder 107. Piston 108 may reciprocate back and forth (e.g., in a first direction and a second direction) within cylinder 107. Piston 108A is fitted within cylinder 107A. Piston 108B is fitted within cylinder 107B. Each piston 108 has two ends, such as end 109A and end 109B of piston 108A and end 109C and 109D of piston 108B. Cylinder 107A may be oriented along axis 110A. Cylinder 107B may be oriented along axis 110B. In one implementation, axis 110A and axis 110B are parallel to one another. In other implementations, cylinder 107A and/or cylinder 107B may be orientated along any arbitrary axis. For example, cylinder 107A and 107B may be orientated in a V-shape configuration with respect to one another. In another example, cylinder 107A and 107B may be perpendicular to one another. In another example, three cylinders may be orientated in a triangular shape. Piston 108A may reciprocate along axis 110A. Piston 108B may reciprocate along axis 110B. For example, piston 108A may move in a first linear direction (e.g., right) along axis 110A in response to a first power stroke. Piston 108A may also move in a second linear direction (e.g., left) in response to a second power stroke. The performance of strokes of a power cycle may be further discussed at least with respect to FIGS. 2A-2D. It may be noted that a single piston is described as fitted in a single cylinder for purposes of illustration, rather than limitation. In other implementations, multiple pistons may be fitted within a common cylinder. It may also be appreciated that in some implementations, piston 108 may travel at a constant speed during a power stroke and match the rotational speed of shaft 115A.

It may be noted that piston 108 fitted within cylinder 107 may perform a power stroke in both linear directions. For example in a four stroke cycle, piston 108A moves in a first linear direction (e.g., right) along axis 110A responsive to a first power stroke. When the first power stroke is performed, the piston 108A may compress an air and fuel mixture on the other side of the piston 108A (e.g., end 109B) as part of a compression stroke. In another implementation, during the first power stroke, piston 108A may compress another material, such as air or other material, may be compressed on the other side of the piston 108A (e.g., end 109B) as part of a compression stroke. The second power stroke may be performed after the air and fuel mixture is compressed at end 109B. The second power stroke moves piston 108A in the second linear direction (e.g., left) along axis 110A. It may be noted that cylinder 107 may be considered to have two chambers, one on each end 109 of the piston 108, where any stroke of a power cycle (e.g., two stroke, four stroke, etc.) may performed in a chamber. It may be further appreciated that a single piston and single cylinder, such as piston 108A and cylinder 107A of the current disclosure, may equivalently function as two cylinders in some modern internal combustion engines such as, a modern automobile engine.

It may be noted that tethered piston engine 101 may be described operating as a four-stroke piston engine for purposes of illustration, rather than limitation. It may be noted that tethered piston engine 101 may be configured to perform any operating cycle (also referred to as power cycle), such as two-stroke or four stroke power cycle. In some implementations, tethered piston engine may be operated in a compression ignition diesel cycle mode (e.g., consumption of diesel oil) and/or be supercharged.

In one implementation, piston 108A and piston 108B are connected to tensile band 111 and reciprocate within the respective cylinder 107A and 107B in response to the power strokes described herein. The tensile band 111 may be held in tension by pulley 113A and pulley 113B (also referred to as drums). As pistons 108 reciprocate, tensile band 111 receives a tensile force from piston 108 and moves in a first linear direction and then moves in a second opposite linear direction about axis 110A. Tensile band is held in tension by pulleys 113 of pulley subsystem 102. The reciprocating pistons 108 impart a tensile force (e.g., pull) on tensile band 111. The tensile band 111, reciprocating in tandem with the attached pistons 108, cause pulleys 113 to alternately rotate in a clockwise direction or a counter clockwise direction. Pulleys 113 may include or otherwise be connected to bearings that allow the pulleys 113 to freewheel (e.g., free spinning) around respective shafts 115A and 115B. Engaging a clutch 116 with respect to pulley 113 allows torque from a rotating pulley 113 to be imparted to the respective shaft 115. Disengaging clutch 116 with respect to pulley 113 allows pulley 113 to spin freely about the respective shaft 115. For example, during a power stroke pulley 113A may be engaged by clutch 116A and pulley 113B may be disengaged by clutch 116B. Engaged pulley 113A may turn shaft 115A, while disengaged pulley 113B may spin freely about shaft 115B. The shafts 115A and 115B may be held in place by bearings (e.g., anti-friction bearings) and be connected to each other by transmission 104. In one implementation, the bearings of engine system 100 may be anti-friction (rolling element type. The bearing may not be trapped on crank throws or crank mains where they bearings would be required to be in two pieces (split) for assembly.

Transmission 104 may allow for shaft 115A and shaft 115B to rotate in opposite directions responsive to different power strokes and translate the rotary motion in opposite directions into rotary motion in a single direction about rotational axis 114A. Flywheel 120 may be implemented in at least one implementation to impart on shafts 115A and 115B enough force to allow pistons 108 to compress a fuel and air mixture during a compression stroke. In some implementations, after a starting ignition and power stroke, the flywheel 120 may not be used to continue engine operation and may be disengaged.

A tensile band 111 (also referred to as tensile member) may be connected to piston 108. For example, end 112A of tensile band 111 may be connected to the end 109A of piston 108A and end 112B of tensile band 111 may be connected to end 109B of piston 108A. End 112C of tensile band 111 may be connected to end 109C of piston 108B and end 112D of tensile band 111 may be connected to end 109D of piston 108B. Tensile band 111 may be held under tension by pulley subsystem 102. Tensile band 111 may affixed to a respective end of piston 108 and receive a tensile force exerted on the tensile band 111 in response to a power stroke in a linear direction. For example, piston 108A may move in the first linear direction (e.g., right) along axis 110A in response to a first power stroke. The linear force of the first power stroke may be imparted on tensile band 111 as a tensile force (e.g., pulling), rather than a compression force. Imparting a tensile force on tensile band 111 allows tensile band 111 to be a lighter weight than for example, a connecting rod where a compressive force is imparted on the connecting rod by the piston during a power stroke.

In one implementation, tensile band 111 may be a thin alloy steel band, similar to a band saw blade. Tensile band 111 may have a high tensile strength and be able to flex without degrading as is runs around pulley subsystem 102. In some implementations, tensile band 111 may be other materials. For example, tensile band 111 may be all or part low alloy steel, carbon steel, stainless steel, aluminum, bi-metal, kevlar, glass, or carbon fiber, among others. In other implementations, tensile band 111 may be a v-belt, tooth belt, chain, cable, or other power transmission element.

The pulley subsystem 102 includes pulley 113A and 113B. Pulley 113A may rotate around rotational axis 114A. Pulley 113B may rotate around rotational axis 114B. In one implementation, pulley subsystem 102 implementing tensile band 111 may translate the reciprocating motion of piston 108 to rotary motion about the respective rotational axis 114. In one implementation, rotational axis 114A and rotational axis 114B are perpendicular to axis 110A and axis 110B, and axis 110A and axis 110B are parallel to one another. In one implementation, rotational axis 114A and rotational axis 114B are parallel to one another. It may be noted that rotational axis 114A and/or rotational axis 114B may be orientated anywhere with respect to one another and/or axis 110A and 110B. Shaft 115A may be connected to pulley 113A (e.g., by using a clutch, such as clutch subsystem 103) along rotational axis 114A. When shaft 115A is connected to pulley 113A, shaft 115A may rotate around rotational axis 114A responsive to the rotation of pulley 113A. Similarly, shaft 115B may be connected with pulley 113B and rotate along rotational axis 114B responsive to the rotation of pulley 113B. Pulley 113A and 113B may hold tensile band 111 under tension. Shaft 115 may be secured by bearings, such as frictionless bearings. Pulleys 113A and 113B may be mounted on frictionless bearings (e.g., frictionless bearings 421A and 421B of FIGS. 4A and 4B) that are in turn mounted on shafts 115A and 115B.

For example, piston 108A may reciprocate along axis 110A in a first linear direction along axis 110A responsive to a first power stroke in a first chamber of cylinder 107A and at a later time, in a second and opposite linear direction along axis 110A responsive to a second power stroke in the second chamber of cylinder 107A. Responsive to the first power stroke, piston 108A may pull the end 112A of tensile band 111 in the first linear direction (e.g., right) and rotate pulley 113A and pulley 113B in clockwise direction. During the second power stroke, piston 108A may pull end 112B of tensile band 111 in the second linear direction (e.g., left) and rotate pulley 113A and pulley 113B in a counter clockwise direction.

In one implementation, pulley 113 of pulley subsystem 102 may be made from aluminum. In other implementations, pulley 113 may be made from, but not limited to, steel, magnesium, composite fiber and resin, titanium, or any lightweight material.

A clutch subsystem 103 may be used to engage and/or disengage pulley 113A with shaft 115A, and to engage and/or disengage pulley 113B with shaft 115B. In one implementation, clutch subsystem 103 may include clutch 116A associated with pulley 113A and clutch 116B associated with pulley 113B. In one implementation, clutch subsystem 103 may alternately couple pulley 113A to shaft 115A while disengaging pulley 113B from shaft 115B during first power stroke, and then couple pulley 113B to shaft 115B while disengaging pulley 113A from shaft 115B during a second power stroke. For example, responsive to a first power stroke the piston 108A may pull the end 112A of tensile band 111 in the first linear direction (e.g., right) and rotate pulley 113A and pulley 113B in clockwise direction. At the start of the first power stroke, clutch subsystem 103 may engage pulley 113A to connect pulley 113A to shaft 115A and disengage pulley 113B to disconnect pulley 113B from shaft 115B. During the first power stroke, both pulley 113A and 113B may rotate clockwise. Pulley 113A rotates shaft 115A clockwise while pulley 113B rotates freely without applying torque shaft 115B. During the second power stroke, the opposite may be performed. In response to the second power stroke, piston 108A may pull end 112B of tensile band 111 in the second linear direction (e.g., left) and rotate pulley 113A and pulley 113B in a counter clockwise direction. A the start of the second power stroke, clutch subsystem 103 may engage pulley 113B to connect pulley 113B to shaft 115B and disengage pulley 113A to disconnect pulley 113A from shaft 115A. During the second power stroke, both pulley 113A and 113B may rotate counter clockwise. Pulley 113B rotates shaft 115B counter clockwise while pulley 113A rotates freely without applying torque to shaft 115B. Additional details of clutch subsystem 103 will be discussed at least with respect to FIGS. 4A-4B.

It may be noted that in at least one implementation, tensile band 111 (and/or the linear path of piston 108) may be at 90 degree angle with a radial torque arm (e.g., radial arm 117) of pulley 113A and pulley 113B for the duration of the first power stroke and the second power stroke. It may be noted that in at least one implementation a tensile band 111 (and/or the linear path of piston 108) may be at substantially a 90 degree angle (i.e., within 5 degrees) with a radial torque arm (e.g., radial arm 117) of pulley 113A and pulley 113B for the duration of a power stroke. A radial arm 117 may be a radius of a pulley, such as pulley 113A or 113B, which is in contact with tensile band 111. For example, during the first power stroke piston 108A moves in a first linear direction (e.g., right) pulling the tensile band 111 along with it. The tensile band 111 contacts pulley 113A so that radial arm 117 is 90 degrees with respect the tensile band 111 (and/or with respect to the linear path of piston 108) during the pull.

Transmission 104 (also referred to as a power transmission) may convert the clockwise rotary motion of shaft 115A (e.g., responsive to the first power stroke) and the counter clockwise rotary motion of shaft 115B (e.g., responsive to the second power stroke) into rotary motion in a single direction about rotational axis 114A. In one implementation, transmission 104 may be coupled to pulley subsystem 102 via shaft 115A and shaft 115B. Transmission 104 may include a system of gears, such as gears 118A-D, connected to a belt 119. In one implementation, belt 119 is a tooth belt. The gears 118A-D translate the clockwise and counterclockwise rotation of shaft 115A and shaft 115B into single direction rotary motion. For example, transmission 104 translates the rotary motion of shaft 115A in a clockwise direction and the rotary motion of shaft 115B in a counter clockwise direction into rotary motion in a single direction (e.g., clockwise rotation) about a rotational axis 114A.

In one implementation, at least one of gear 118A or gear 118C may implement a bushing, such as a taper-loc bushing, to secure the gear to shaft 115A and/or shaft 115B, respectively. In another implementation, gear 118B and/or 118D may be idler pulleys that take up slack of belt 119. It may be noted that transmission 104 may include any number of gears or belts or types of gears or types of belts.

In one implementation, engine system 100 includes flywheel 120. The flywheel 120 may rotate responsive to the rotary motion of shaft 115A. Flywheel may rotate in a single direction (e.g., clockwise) around rotational axis 114A. Flywheel 120 may store kinetic energy and be of any diameter and mass. It may be noted that in one example, upon start-up the flywheel 120 may start rotating in response to a small starter motor or other device. It may be noted that flywheel 120 may be connected to shaft 115A. In another implementation, flywheel 120 may be connected to an additional shaft (not shown) in addition to shaft 115.

In one implementation, tethered piston engine 101 may be operated intermittently so the tethered piston engine is not performing a power stroke and/or consuming fuel during intermittent periods of time. For example, when power or torque is not needed, both shafts 105 may be disconnected from piston 108 using clutch subsystem 103 and no fuel is injected into cylinder 107. In one implementation, tethered piston engine 101 may not idle. For example, when a vehicle implanting a tethered piston engine 101 is not moving, clutch subsystem 103 may disengage both pulley 113A and pulley 113B. Pistons 108 may or may not continue reciprocating. No fuel is injected into cylinders 107 and no combustion events occur. In some implementations, to move a vehicle from a stopped position, a small force may be applied to and subsequently extracted from the flywheel 120 to start movement of pistons 108. Tethered piston engine 101 may start to perform power strokes to move vehicle from a stopped position. In one implementation, flywheel 120 may be an energy storage device that helps facilitate intermittent operation (e.g., no idle) of tethered piston engine 101. For example, when a vehicle is stopped at a traffic signal, the inertia of flywheel 120 may enable pistons 108 to reciprocate without a combustion event or the injection of fuel into cylinders 107. In another implementation, tethered piston engine 101 may operate intermittently and not consume fuel when coasting (e.g., moving but without a load). For example, when the vehicle implementing a tethered piston engine 101 is coasting down a hill, clutch subsystem 103 may disengage both pulley 113A and pulley 113B allowing shaft 115A and 115B to rotate while disengaged from tethered piston engine 101. Fuel may not be injected into cylinder 107 and power strokes may not be performed. In one implementation, control subsystem 106 may control tethered piston engine 101 to operate intermittently. For example, control subsystem 106 may control the operating of a pneumatic valve and/or clutch 116, as described below at least with respect to FIG. 2A-2D. In one implementation, engine subsystem 101 may not be operating (e.g., in a vehicle stopped at a red light), but flywheel 120 may be spinning. The inertia energy stored in the flywheel 120 may be used to move the vehicle and bring the vehicle up to speed before the engine subsystem 101 is started.

In one implementation, engine system 100 includes control subsystem 106. In one example, control subsystem 106 may be an engine control unit (ECU). An ECU may be an electronic control unit that controls one or more actuators in engine system 100. In one example, the control subsystem 106 may receive data signals from one or more sensors in engine system 100, and adjust the actuators (e.g., one or more control valve actuators, solenoids, or solid state devices such as for ignition) according to the received data signals. For example, control subsystem 106 may control the air and fuel mixture (e.g., the ratio of air to fuel) injected or inducted into cylinder 107 by sensing throttle position and oxygen. Control subsystem 106 may sense engine temperature to control fuel injection. Control subsystem 106 may sense load torque to control ignition timing. Control subsystem 106 may sense the revolutions per minute (rpm) of shaft 115 to control valve timing. Control subsystem 106 may sense mass air flow and fuel type to control valve lift distance. Control subsystem 106 may sense air intake temperature to control valve timing and lift. Control subsystem 106 may sense piston position to control valve timing, lift, duration and fuel injection timing and duration. Control subsystem 106 may sense all temperature, load, fuel type, piston position and emissions combined with operator (accelerator) input to manage the compression ratio. Ignition and fuel injection may be made to occur at any piston position. Since there is no crankshaft with a throw that must follow through, the piston is free to reverse from any position when the correct compression ratio has been achieved. In-head pressure sensors may signal compression pressure to control compression ratio. Control subsystem 106 may sense emissions and/or determine the emission regulations for the current location (e.g., by using global positioning system (GPS), etc.) to control clutch timing, ignition timing, and valve timing. Control subsystem 106 may sense the transmission and/or direction and control clutch duration. It may be noted that engine system may operate in any direction (e.g., counterclockwise, clockwise) and may eliminate reverse gearing, in some implementations. It may be noted that in one implementation, engine system 100 does not include a crankshaft or camshaft and the control subsystem 106 does not sense crankshaft angle or camshaft angle. In one implementation, control subsystem 106 may control tethered piston engine 101 to operate intermittently. It may be noted that at least part of the control of control subsystem 106 may be implemented by mechanical and/or pneumatic operations. It may be noted that in some implementations, the engine system 100 may have a freely variable compression ratio. For example, engine system 100 may have any compression ratio on any stroke to achieve ideal conditions using variables such as efficiency or pollution constraints.

In one implementation, electronic valve control may be implemented using control subsystem 106. Electronic valve control may not use a camshaft and offers full electronic control of valve (e.g., intake and/or exhaust) opening, valve closing, or area of valve opening. In some implementations, the accurate control of the intake valve opening and amount may function as a throttle, may be cause for the elimination of a dedicated throttle device.

In one implementation, at least some parts of engine system 100 may implement ceramic components that allow operating temperatures to be increased. Fuel efficiency may be improved and the cooling system may be eliminated. In another implementation, external cooling of cylinder 107 and/or cylinder heads may be performed by air or liquid. In some implementations, cooling of piston 108 may be performed by creating passageway through the piston that is used to transfer air or coolant, for example. Lubrication may be delivered to the piston or cylinder interface in the air or coolant.

It may be noted that cylinders 107 are described as performing power cycles for purposes of illustration, rather than limitation. In another implementation, the cylinders of tethered piston engine 101 may be used as pumps for other fluids and/or as superchargers, for example. Multiple "TPE" systems of different displacements or configurations may be stacked along the shafts 115 for these purposes.

In one implementation, a tethered piston engine 101 may be used to charge an energy storage system such as those used by hybrid electric vehicles, for example. In one implementation, flywheel 120 may be used as the energy storage for a hybrid vehicle. Flywheel 120 may have its own clutch to engage or disengage with the output shaft 115A as determined by the control system 106. Flywheel 120 may be driven to high RPM while performing a braking function in order to capture the energy of vehicle deceleration.

Figure 2A:
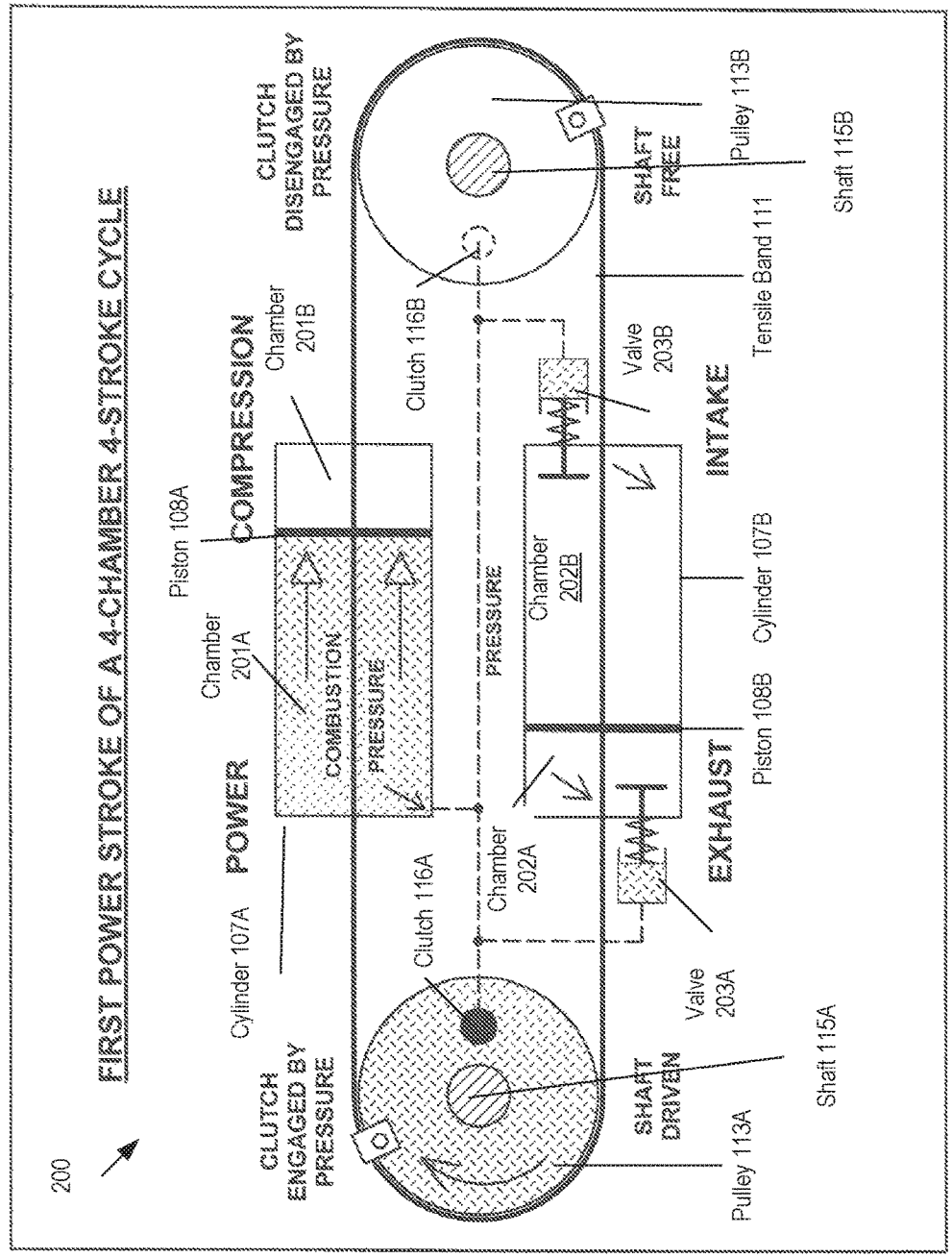
FIG. 2A illustrates a first power stroke of a tethered piston engine, in accordance with some implementations of the disclosure.

FIG. 2A illustrates a first power stroke of a tethered piston engine, in accordance with some implementations of the disclosure. It may be noted that tethered piston engine 200 may include at least some elements as described with respect to FIG. 1. Tethered piston engine 200 includes cylinder 107A and piston 108A (top) and cylinder 107B and piston 108B (bottom) connected by tensile band 111. Tensile band 111 is held under tension by pulley 113A and 113B. It may be noted that FIG. 2A describes a first power stroke of tethered piston engine 200 (e.g., piston 108A in chamber 201A) as well as the other complimentary strokes of a power cycle that may occur concurrently with respect to chamber 201B, chamber 202A, and chamber 202B, unless otherwise described.

In one implementation, during a first power stroke, a fuel and air mixture is ignited in chamber 201A of cylinder 107A. The combustion of the fuel and air mixture (e.g., combustion event) causes the piston 108A to move in a linear direction (e.g., right). The movement to the right of piston 108A in response to the combustion event compresses a fuel and air mixture in chamber 201B (e.g., compression stroke). Piston 108A pulls tensile band 111 (e.g., to the right) and causes pulley 113A and 113B to rotate in a clockwise direction. Clutch 116A may be engaged with pulley 113A enabling pulley 113A to rotate in a clockwise direction and to drive a shaft 115A in a clockwise direction. Clutch 116B may be disengaged so that pulley 113B rotating in a clockwise direction does not drive a corresponding shaft 115B In one implementation, pressure from a combustion event may be used to control clutch 116A, 116B, valve 203A, and/or valve 203B. For example, the combustion pressure in chamber 201A may be used to engage clutch 116A, disengage clutch 116B, open valve 203A (e.g., exhaust valve), and open valve 203B (e.g., intake valve). A small amount of the pressure from the combustion event may be bled from chamber 201A to control the functioning of clutch 116A, clutch 116B, valve 203A, and/or valve 203B. The timing for operating clutch 116 and/or valve 203 may be correct because pressure generated at the beginning of the combustion event (e.g., power stroke) may be used to operate clutch 116 and/or valve 203 prior to causing piston 108A to move. Clutch 116B may be disengaged from pulley 113B by pressure introduced by the combustion event in chamber 201A. For example, a clutch element may float on a film of gas, removing frictional contact with pulley 113B. It may be noted that the appropriate use of check and shuttle valves (not shown) may prevent backflow of combustion gasses into other chambers.

In one implementation, concurrent with the power stroke in chamber 201A, a compression stroke may be performed in chamber 201B, an exhaust stroke may be performed in chamber 202A, and/or an intake stroke may be performed in chamber 202B. It may be noted that valves (not shown) corresponding to cylinder 107A or cylinder 107B may be closed. It also may be noted that the power stroke in chamber 201A may cause piston 108B in cylinder 107B to move in an opposite linear direction (e.g., left). Piston 108B may perform the exhaust stoke and intake stroke as piston 108B moves left.

It may be noted that pressure from a combustion event may be used to control other valves (not shown), may be from other chambers (e.g., chamber 201B, 202A, 202B), may be from a separate device (not shown), and/or may be used to engage or disengage clutch 116. It also may be noted that in one implementation tethered piston engine 200 operating intermittently (e.g., vehicle is stopped at a red light and tethered piston engine 200 is not consuming fuel), may not perform a compression stroke and compression pressure from a compression event is not generated. An external device may be implemented to operate clutch 116A and 116B may be implemented.

Figure 2B:
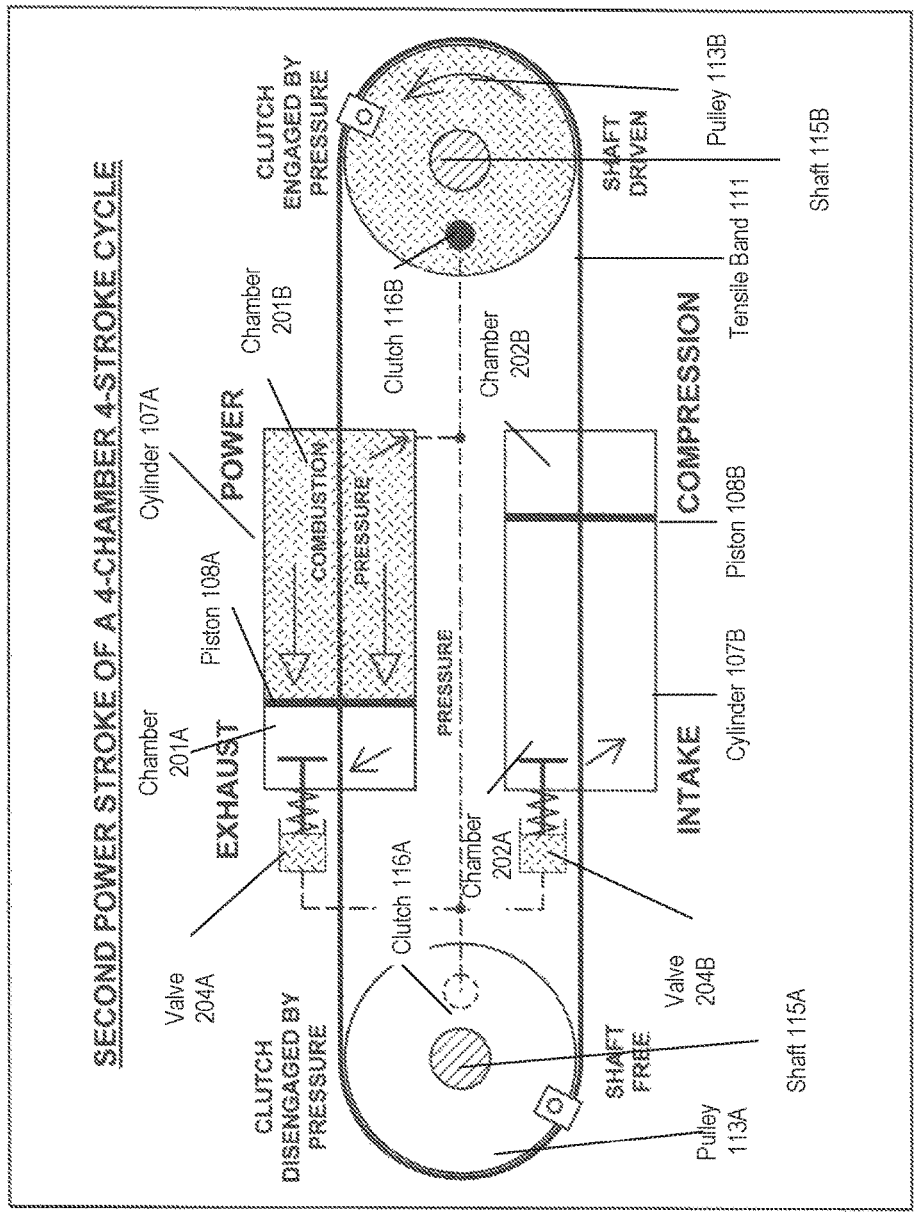
FIG. 2B illustrates a second power stroke of a tethered piston engine, in accordance with some implementations of the disclosure.
Figure 2C:
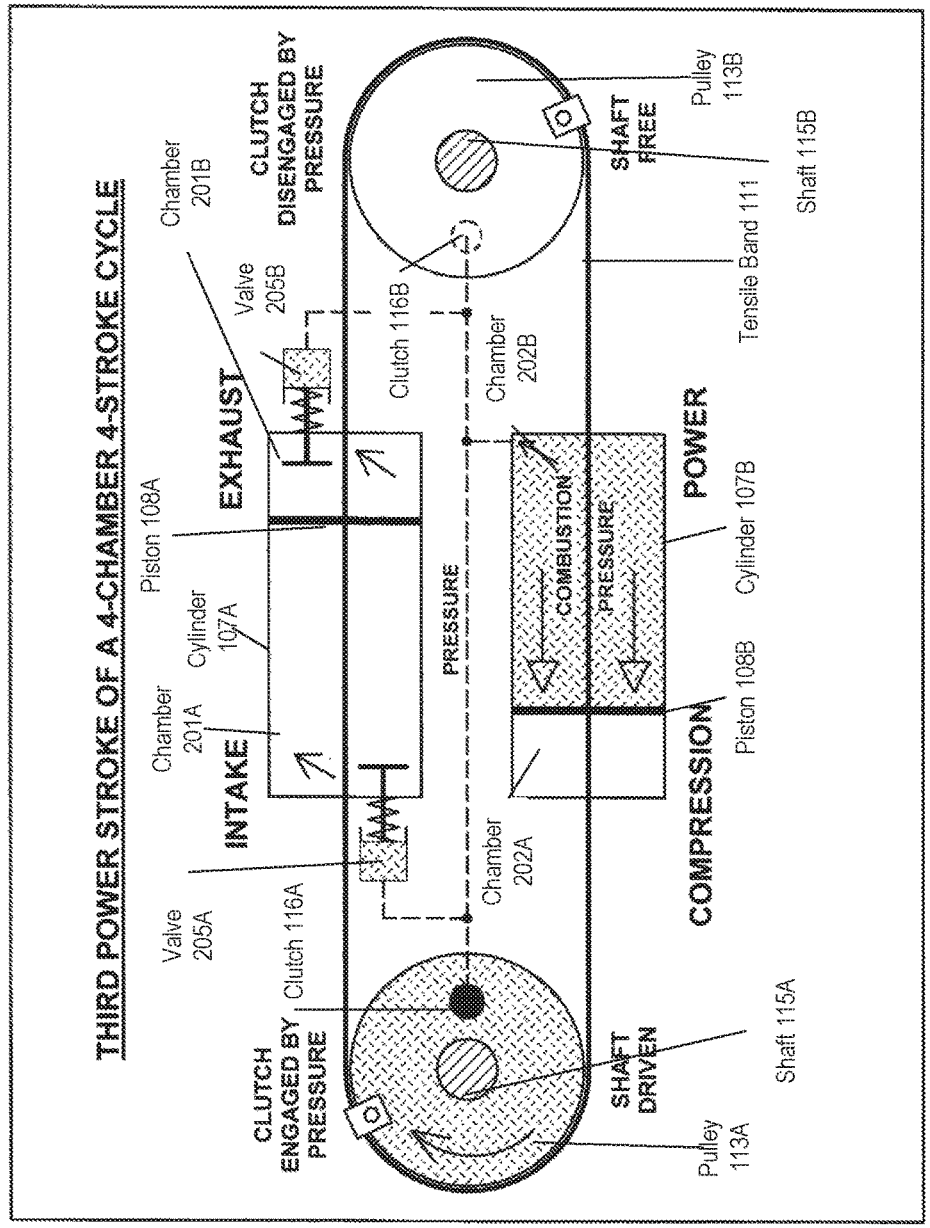
FIG. 2C illustrates a third power stroke of a tethered piston engine, in accordance with some implementations of the disclosure.
Figure 2D:
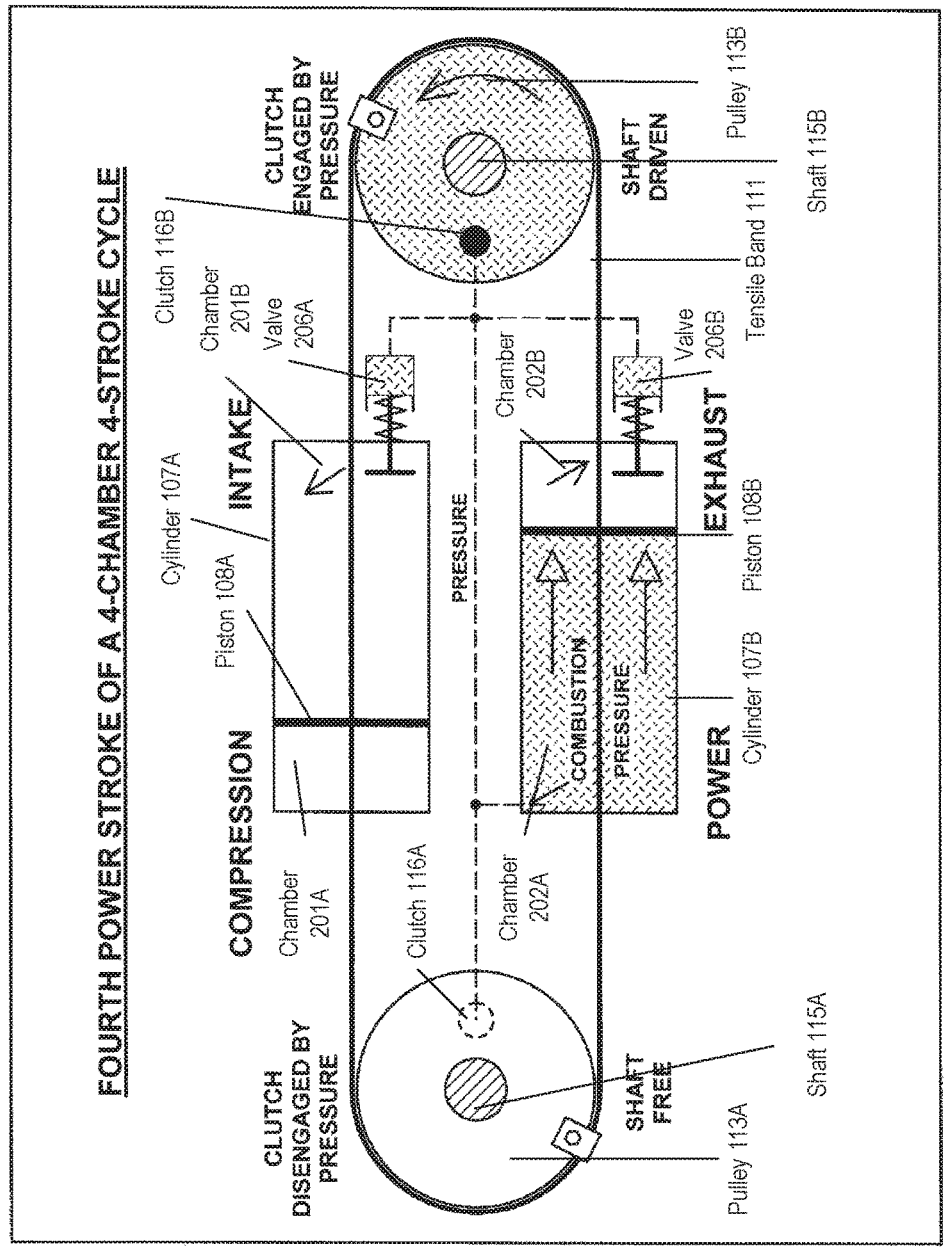
FIG. 2D illustrates a fourth power stroke of a tethered piston engine, in accordance with some implementations of the disclosure.

It may be noted that tethered piston engine 200 shows two valves 203 for purposes of illustration, rather than limitation. Additional valves may be implemented, such as valves (not shown) that are closed during the first power stroke. FIGS. 2B-2D may introduce some additional valves not illustrated in FIG. 2A. In one implementation, intake valves (e.g., valve 203B) and exhaust valves (e.g., valve 203A) may be operated using pressure of a combustion event that controls actuators to open the valves (e.g., pneumatic valves). In one implementation, the valves 203 may be closed by a spring. In another implementation, the valves 203 may be closed by pressure from the combustion event. In one implementation, the source of the gas pressure may be at least in part from an external device. In another implementation, the additional control valves (not shown) may be coupled between a chamber (e.g., chamber 201A) and the valve actuators. The control valves may be controlled electronically by, for example, control subsystem 106 of FIG. 1. The control valves may enable additional tuning and timing options. In one implementation, an accumulator vessel (e.g., tank) may store gas under pressure. In one implementation, the pressurized gas may be replenished by gas from a combustion event, using for example, a one-way check valve that controls and moderates the flow of gas from a combustion event. In some implementations, combustion byproducts may be kept separate from control gases by using a pair of double rod piston-in-cylinder actuators. A smaller actuator is operated by hot dirty high pressure combustion gas to drive the rod one way and then the other. A larger actuator is connected in tandem to the rod, so that the large actuator will pump low pressure fresh control air as it is carried back and forth by way of the connected rods. The larger actuator may stall when low pressure is greater than regulated output pressure to the control circuit. The cycle rate may be low due to the large volume of this device in relation to the consumption of the actuators driving the engine valves, clutches and the control (or power) valves.

FIG. 2B illustrates a second power stroke of a tethered piston engine, in accordance with some implementations of the disclosure. It may be noted that tethered piston engine 210 may include at least some elements as described with respect to FIG. 1 and FIG. 2A. It may be noted that FIG. 2B describes a second power stroke of tethered piston engine 210 (e.g., piston 108A in chamber 201B) as well as the other complimentary strokes of a power cycle that may occur concurrently with respect to chamber 201A, chamber 202A, and chamber 202B, unless otherwise described. It also may be noted that in some implementations the second power stroke may be performed subsequent to the first power stroke as described with respect to FIG. 2A.

In one implementation, during a second power stroke, a fuel and air mixture is ignited in chamber 201B of cylinder 107A. The combustion of the fuel and air mixture causes the piston 108A to move in a linear direction (e.g., left). The movement to the left of piston 108A in response to the combustion event compresses a fuel and air mixture in chamber 201A (e.g., combustion stroke). Piston 108A pulls tensile band 111 (e.g., to the left) and causes pulley 113B and pulley 113A to rotate in a counter clockwise direction. Clutch 116B may be engaged with pulley 113B enabling pulley 113B to rotate in a counter clockwise direction and to drive a respective shaft 115B in a counter clockwise direction. Clutch 116A may be disengaged so that pulley 113A rotating in a counter clockwise direction does not drive a corresponding shaft 115A.

Similar to the description with respect to FIG. 2A, pressure from a combustion event may be used to control clutch 116A, 116B, valve 204A, and/or valve 204B. For example, the combustion pressure in chamber 201B may be used to engage clutch 116B, disengage clutch 116A, open valve 204A (e.g., exhaust valve), and open valve 204B (e.g., intake valve). A small amount of the pressure from the combustion event may be bled from chamber 201B to control the functioning of clutch 116A, 116B, valve 204A, and/or valve 204B.

In one implementation, concurrent with the power stroke in chamber 201B, an exhaust stroke may be performed in chamber 201A, an intake stroke may be performed in chamber 202A, and/or a compression stroke may be performed in chamber 202B. It may be noted that the power stroke in chamber 201B may cause piston 108B in cylinder 107B to move in an opposite linear direction (e.g., right). Piston 108B may perform the compression stoke and intake stroke as piston 108A moves right.

FIG. 2C illustrates a third power stroke of a tethered piston engine, in accordance with some implementations of the disclosure. It may be noted that tethered piston engine 220 may include at least some elements as described with respect to FIG. 1 and FIGS. 2A-2B. It may be noted that FIG. 2C describes a third power stroke of tethered piston engine 220 (e.g., piston 108B in chamber 202B) as well as other complimentary strokes of a power cycle that may occur concurrently with respect to chamber 201A, chamber 201B, and chamber 202A, unless otherwise described. It also may be noted that in some implementations the third power stroke may be performed subsequent to the second power stroke as described with respect to FIG. 2B.

In one implementation, during a third power stroke, a fuel and air mixture is ignited in chamber 202B of cylinder 107B. The combustion of the fuel and air mixture causes the piston 108B to move in a linear direction (e.g., left). The movement to the left of piston 108B in response to the combustion event compresses a fuel and air mixture in chamber 202A (e.g., combustion stroke). Piston 108B pulls tensile band 111 (e.g., to the left) and causes pulley 113B and pulley 113A to rotate in a clockwise direction. Clutch 116A may be engaged with pulley 113A enabling pulley 113A to rotate in a clockwise direction and to drive a respective shaft 115A in a clockwise direction. Clutch 116B may be disengaged so that pulley 113B rotating in a clockwise direction does not drive a corresponding shaft 115B.

Similar to the description with respect to FIG. 2A, pressure from a combustion event may be used to control clutch 116A, 116B, valve 205A, and/or valve 205B. For example, the combustion pressure in chamber 202B may be used to engage clutch 116A, disengage clutch 116B, open valve 205A (e.g., intake valve), and open valve 205B (e.g., exhaust valve). A small amount of the pressure from the combustion event may be bled from chamber 202B to control the functioning of clutch 116A, 116B, valve 205A, and/or valve 205B.

In one implementation, concurrent with the power stroke in chamber 202B, a compression stroke may be performed in chamber 202A, an intake stroke may be performed in chamber 201A, and/or an exhaust stroke may be performed in chamber 201B. It may be noted that the power stroke in chamber 202B may cause piston 108A in cylinder 107A to move in an opposite linear direction (e.g., right). Piston 108A may perform the exhaust stroke and intake stroke as piston 108A moves right.

FIG. 2D illustrates a fourth power stroke of a tethered piston engine, in accordance with some implementations of the disclosure. It may be noted that tethered piston engine 230 may include at least some elements as described with respect to FIG. 1 and FIGS. 2A-2C. It may be noted that FIG. 2D describes a fourth power stroke of tethered piston engine 230 (e.g., piston 108B in chamber 202A) as well as the other complimentary strokes of a power cycle that may occur concurrently with respect to chamber 201A, chamber 201B, and chamber 202B, unless otherwise described. It also may be noted that in some implementations the fourth power stroke may be performed subsequent to the third power stroke as described with respect to FIG. 2C.

In one implementation, during a fourth power stroke, a fuel and air mixture is ignited in chamber 202A of cylinder 107B. The combustion of the fuel and air mixture causes the piston 108B to move in a linear direction (e.g., right). The movement to the right of piston 108B in response to the combustion event compresses a fuel and air mixture in chamber 202B (e.g., combustion stroke). Piston 108B pulls tensile band 111 (e.g., to the right) and causes pulley 113B and pulley 113A to rotate in a counter clockwise direction. Clutch 116B may be engaged with pulley 113B enabling pulley 113B to rotate in a counter clockwise direction and to drive a respective shaft 115B in a counter clockwise direction. Clutch 116A may be disengaged so that pulley 113A rotating in a counter clockwise direction does not drive a corresponding shaft 115A Similar to the description with respect to FIG. 2A, pressure from a combustion event may be used to control clutch 116A, 116B, valve 206A, and/or valve 206B. For example, the combustion pressure in chamber 202A may be used to engage clutch 116B, disengage clutch 116A, open valve 206A (e.g., intake valve), and open valve 206B (e.g., exhaust valve). A small amount of the pressure from the combustion event in chamber 202A may be bled to control the functioning of clutch 116A, 116B, valve 206A, and/or valve 206B.

In one implementation, concurrent with the power stroke in chamber 202A, an exhaust stroke may be performed in chamber 202B, an intake stroke may be performed in chamber 201B, and/or a compression stroke may be performed in chamber 201A. It may be noted that the power stroke in chamber 202A may cause piston 108A in cylinder 107A to move in an opposite linear direction (e.g., left). Piston 108A may perform the compression stoke and intake stroke as piston 108A moves left.

Figure 2E:
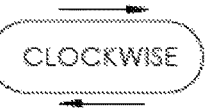
FIG. 2E illustrates a diagram of the state of components during the power strokes of a tethered piston engine, in accordance with some implementations of the present disclosure.

FIG. 2E illustrates a diagram of the state of components during the power strokes of a tethered piston engine, in accordance with some implementations of the present disclosure. In one implementation, diagram 240 may illustrate the state of components during the power strokes described in FIGS. 2A-2D. Stroke one of diagram 240 may correspond to FIG. 2A. Stroke two of diagram 240 may correspond to FIG. 2B. Stroke three of diagram 240 may correspond to FIG. 2C. Stroke four of diagram 240 may correspond to FIG. 2D. For example, referring to components of FIG. 2A, stroke one of diagram 240 illustrates a power stroke in chamber one (e.g., chamber 201A). The state of clutch A (e.g., clutch 116A) is closed and engaged. The state of clutch B (e.g., clutch 116B) is open and free spinning. The state of the intake valve and exhaust valve of chamber one is closed. The spark plug, in a gas engine for example, has ignited. Tether (e.g., tensile band 111) moves in a clockwise direction. Stroke two, stroke three, and stroke four perform similarly and may be illustrated in FIGS. 2B-2D, respectively.

Figure 3:
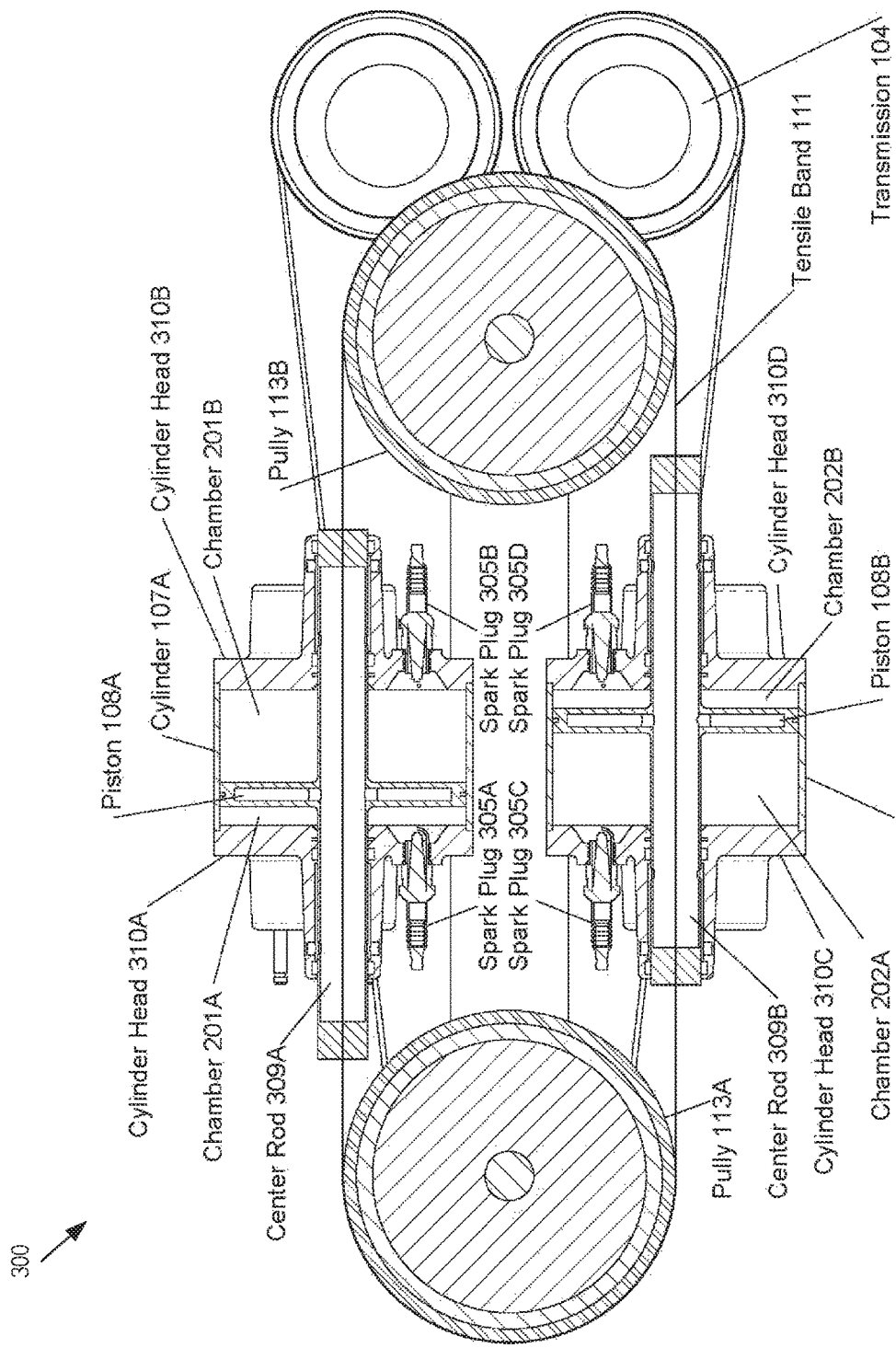
FIG. 3 illustrates a diagram of a cross section of a tethered piston engine, in accordance with some implementations of the disclosure.

FIG. 3 illustrates a diagram of a cross section of a tethered piston engine, in accordance with some implementations of the disclosure. It may be noted that tethered piston engine 300 may include at least some elements as described with respect to FIG. 1 and FIGS. 2A-2D. Tethered piston engine 300 shows spark plugs 305 coupled to cylinders 107. Spark plug 305A is associated with chamber 201A. Spark plug 305B is associated with chamber 201B. Spark plug 305C is associated with chamber 202A. Spark plug 305D is associated with chamber 202B. Spark plugs 305 may ignite the fuel and air mixture for a gasoline powered tethered piston engine 300, for example. In one implementation, spark plugs 305 may be controlled by control subsystem 106 of FIG. 1.

Tethered piston engine 300 shows tensile band 111 embedded in or connected to center rod 309, in accordance with one implementation. Center rod 309 may be part of or separate from piston 108. Center rod 309 may be formed in an elongated or tubular shape to cover some or all of the part of tensile band 111 that is disposed within cylinder 107. Center rod 309 may extend on both sides of piston 108 and pass through the cylinder heads 310 of cylinder 107. For example, center rod 309A is connected to piston 108A and tensile band 111. Center rod 309A may pass through cylinder head 310A or cylinder head 310B as piston 108A reciprocates in cylinder 107A. Center rod 309B is connected to piston 108B and tensile band 111. Center rod 309B may pass through cylinder head 310C or cylinder head 310D as piston 108A reciprocates in cylinder 107A. In one implementation, cylinder 107 may include a seal, such as a gasket or compression ring, that allows center rod 309 to slide and reciprocate through cylinder head 310 with little to no friction and prevent leakage of combustion gasses and/or the compressed air and fuel mixture, for example.

Figure 4A:
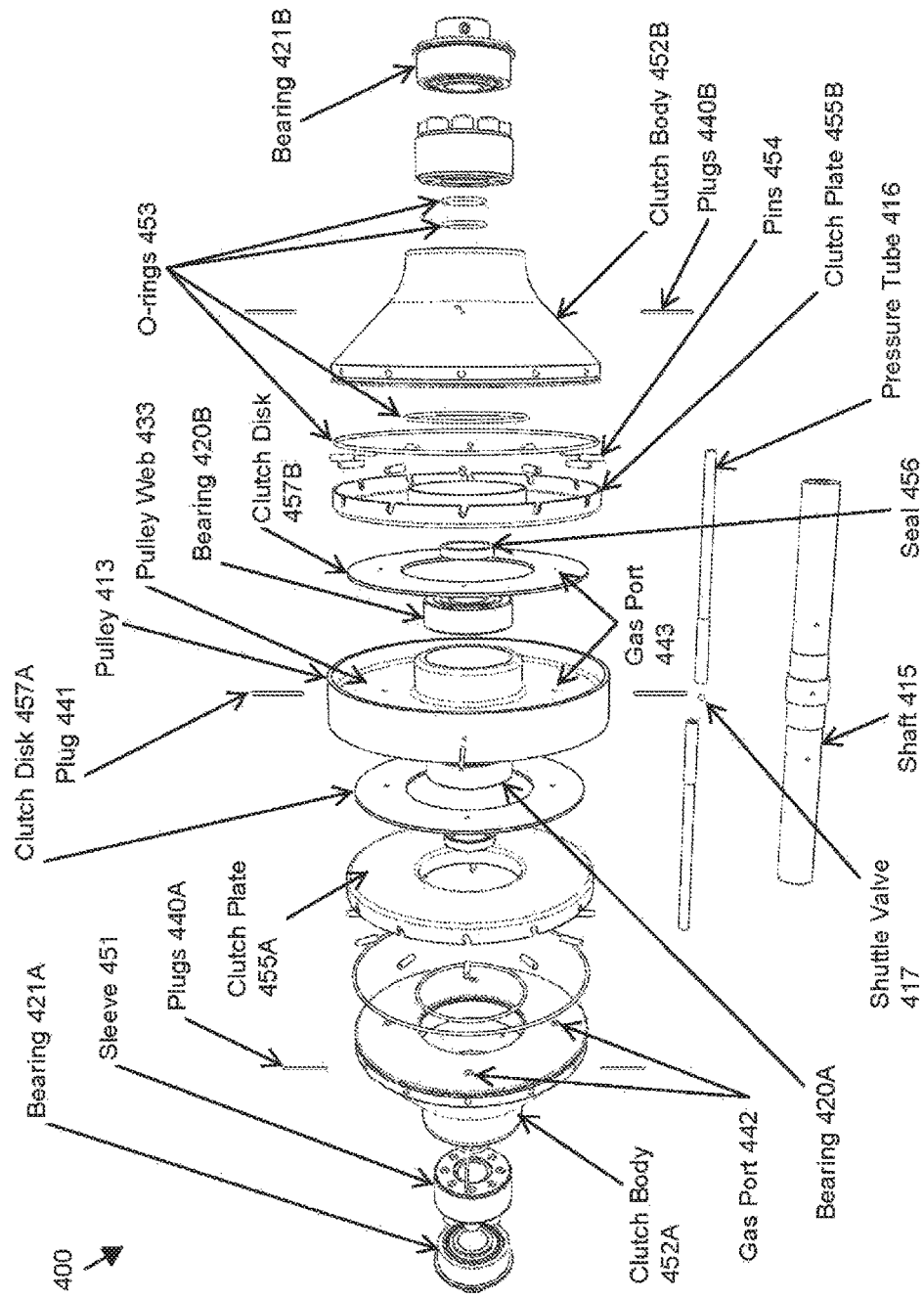
FIG. 4A illustrates a diagram of an exploded view of a clutch subsystem, in accordance with some implementations of the disclosure.

FIG. 4A illustrates a diagram of an exploded view of a clutch subsystem, in accordance with some implementations of the disclosure. It may be noted that clutch 400 (also referred to as a pneumatic actuated clutch or clutch subsystem) may include similar elements as described with respect to FIG. 1 and FIGS. 2A-2D. Clutch 400 shows pulley 413. Pulley 413 may be similar to pulley 113 as described at least with respect to FIG. 1 and FIGS. 2A-2D. It may be noted that in some implementations the elements on one side of pulley 413 may be similar to elements on the opposite side of pulley 413. For example, clutch disk 457A is located on the left side of pulley 413, and a similar clutch disk 457B is located in a similar position on the right side of pulley 413.

In one implementation, pulley 413 contains or is connected to pulley web 433. In one example, pulley web 433 is a thin central web that is part of pulley 413. Pulley web 433 may be on both interior sides of pulley 413. A clutch disk 457 may be connected to both pulley webs 433 on both sides of pulley 413. Clutch disk 457A may be connected to a first pulley web 433 on the left side of pulley 413. Clutch disk 457B may be connected to a second pulley web 433 on the right side of pulley 413. In one example, clutch disk 457 is bonded to pulley web 433. Clutch plates 455 may be adjacent to clutch disks 457 on both sides of pulley 413. In one implementation, clutch plates 455 are steel clutch plates.

In one implementation, as described above at least with respect to FIG. 1 and FIGS. 2A-2D, clutch 400 may be engaged when pressurized gas is fed to the outer side of clutch plates 455 so that the clutch plates 455 may engage with clutch disks 457. Pressurized gas (also referred to as compressed gas) may be a gas or mixture of gases that are under pressure. In one implementation, the pressurized gas may be combustion gases from a combustion event from a chamber of tethered piston engine 101, for example. In other implementations, the pressurized gas may be stored in an accumulation vessel. It may be noted that supplying pressurized gas to operate clutch 400 or valves may be implemented in a number of different ways. For example, a pump may be implemented to accumulate a gas, such as air, in an accumulation vessel. When the clutch disks 457 are engaged with clutch plates 455, rotary motion of pulley 413 may be transmitted to shaft 415. It may be noted that bearings 420 (e.g., ball bearings) may be fitted in the center portion of pulley 413 and allow pulley to spin freely (e.g., not engage with shaft 415) unless clutch 400 is engaged. Pressurized gas to engage clutch 400 may be fed to the clutch plates 455 through gas ports 442. A gas port 422 may be on left side of clutch plate 455 and another gas port (not shown) may be on the right side of clutch plate 455B. In one implementation, gas ports, such as gas port 422, may be embedded or formed in the clutch body 452.

In another implementation, as described above at least with respect to FIGS. 2A-2D, clutch 400 is disengaged by pressurized gas that is fed at the interface of clutch plate 455 and clutch disk 457 to create a thin gas film between clutch plate 455 and clutch disk 457. The thin film of gas creates a separation between clutch plate 455 and clutch disk 457 allowing clutch plate 455 and clutch disk 457 to float. The thin film of gas that creates a separation between clutch plate 455 and clutch disk 457 also allows clutch plate 455 and clutch disk 457 to be maintained in close proximity and ready to re-engage clutch 400. In one implementation, pressurized gas is distributed to the interface of clutch plate 455 and clutch disk 457 using pressure tube 416 and shuttle valve 417.

Clutch 400 may include other components such as bearings 421, sleeve 451, plugs 440, plug 441, pins 454, O-rings 453, clutch body 452, seal 456, among other elements. In one implementation, bearings 421 may be sealed ball bearings. In one implementation, sleeve 451 may be a tapered locking sleeve. In one implementation, seal 456 may be a spring loaded dynamic seal. In may be noted that other clutch designs may be implemented. For example, a one-way sprag clutch may be implemented. In one example, a sprag clutch may be a one-way freewheel clutch. When a sprag clutch rotates in one direction, rollers or sprags (e.g., figure-eight-shaped sprag) slip or free-wheel. When torque is applied in the opposite direction, the rollers or sprags may tilt producing friction to prevent the clutch from rotating. In another example, a one-way roller-on-ramp style clutch may be implemented. In another example, a wrap-spring style clutch (e.g., one-way clutch) may be implemented. In still another example, clutch 400 may implement twin clutch disks that are in close proximity to pulley web 433 on each side of pulley 413. Engagement of the twin clutch disks may be performed by vacuum or pressure. Once the twin clutch disks are engaged, the clutch disks may be forced tighter by ball or roller or sprag elements that create increasing clutch engagement pressure with increasing torque. Disengagement of the twin clutch disks may be performed by stopping or braking the race that contains the balls or rollers or sprag elements. It may be noted that a single clutch 400 is described for purposes of illustration. In some implementations, two or more clutches may be implemented as described above with respect to at least FIG. 1-2D.

Figure 4B:
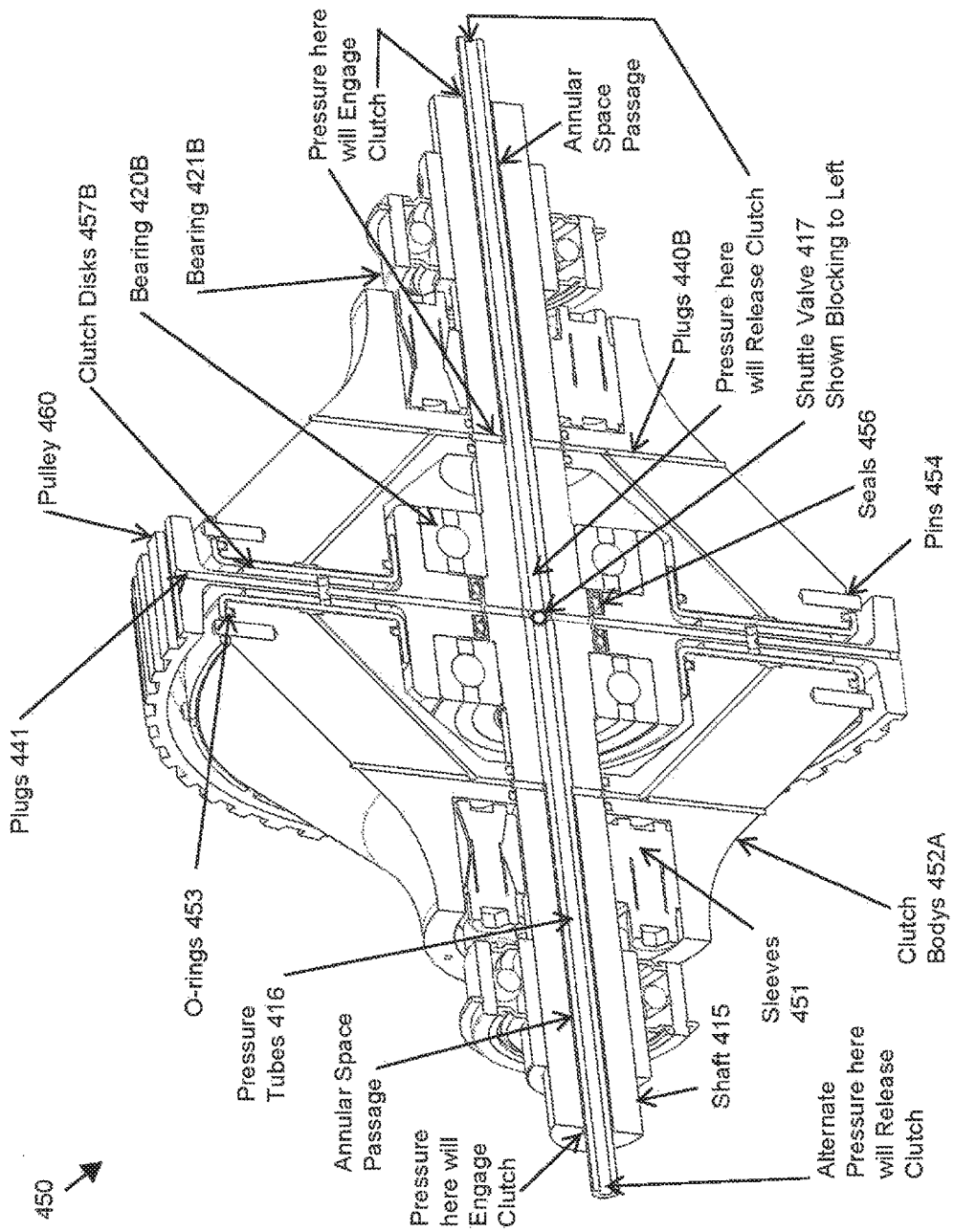
FIG. 4B illustrates a diagram of a cross sectional view of a clutch subsystem, in accordance with some implementations of the disclosure.

FIG. 4B illustrates a diagram of a cross sectional view of a clutch subsystem, in accordance with some implementations of the disclosure. It may be noted that clutch 450 (also referred to as clutch subsystem) may include similar elements as described with respect to FIG. 1-4A. In one implementation, clutch 450 may illustrate a cross sectional view of clutch 400 described with respect to FIG. 4A. Pulley 460 illustrates an alternative implementation of pulley 413 described with respect to FIG. 4A. Pulley 460 shows a toothed pulley that may be implemented together with a toothed tensile band (not shown).

In one implementation, pressure tube 416 is embedded in shaft 415. Pressure tube 416 may receive pressurized gas from or in response to combustion events in the chambers (e.g., chamber 201A, 201B, 202A, and/or 202B) of tethered piston engine as described with respect to FIG. 2A-2D. For example, gas pressure from chamber 201B may be used (e.g., in the center bore of either of pressure tubes 416) to release clutch 450 (e.g., separate clutch plate and clutch disk). Gas pressure from chamber 202B may be used (e.g., in both annular space passageways outside of tubes pressure tubes 416) to engage clutch 450 (e.g., engage clutch plates with clutch disks). Gas pressure from chamber 202A may be used to release clutch 450 (e.g., separate clutch plate and clutch disk). Gas pressure from chamber 202A may be used to engage clutch 450 (e.g., engage clutch plates with clutch disks). It may be noted that different combinations of gas pressure from different chambers to engage or disengage clutch 450 may be implemented. It may also be noted that clutch 450 may be implemented using other clutch types. For example, a clutch 450 may use electromagnetics or hydraulics to engage or release clutch 450. Air pressure or vacuum may also be used by clutch 450. It may be noted that clutch 450 and suitable clutch technology may be implemented.

Figure 5:
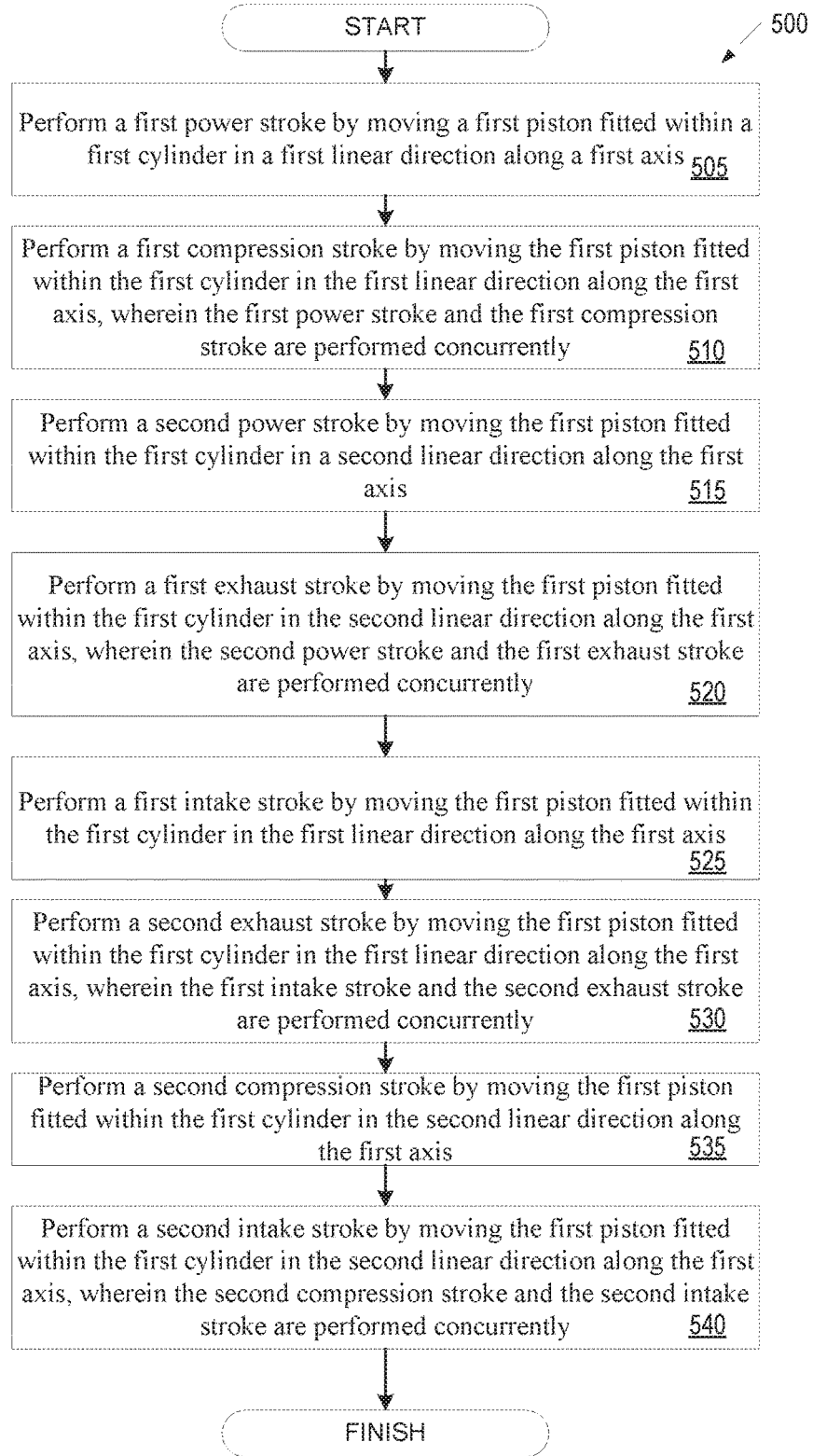
FIG. 5 is a flow diagram of the operation of an engine system that includes a tethered piston engine, in accordance with some implementations of the disclosure.

FIG. 5 is a flow diagram of the operation of an engine system that includes a tethered piston engine, in accordance with some implementations of the disclosure. In one implementation, some or all the operations described below may be performed by engine system 100. In one implementation, some or all the operations described below may be performed by tethered piston engine, such as tethered piston engine 101 described with respect to FIG. 1 and/or tethered piston engine described with respect to other Figures herein. It may be noted that other components may be used in conjunction with the tethered piston engine to perform some or all the operations. For purposes of illustration, rather than limitation, components of FIG. 1 are described below as implementing the method 500.

Method 500 begins at block 505 where the engine system 100 performing the method performs a first power stroke by moving a first piston 108A fitted within a first cylinder 107A in a first linear direction (e.g. right) along a first axis 110A. At block 510, engine system 100 performs a first compression stroke by moving the first piston 108A fitted within the first cylinder 107A in the first linear direction (e.g., right) along the first axis 110A. The first power stroke and the first compression stroke are performed concurrently. A tensile force of the first piston 108A moving in the first linear direction (e.g., right) is received responsive to the first power stroke by a tensile band 111 affixed to a first end 109A of the first piston 108A.

Method 500 continues to block 515 where engine system 100 performs a second power stroke by moving the first piston 108A fitted within the first cylinder 107A in a second linear direction (e.g., left) along the first axis 110A. At block 520, engine system 100 performs a first exhaust stroke by moving the first piston 108A fitted within the first cylinder 107A in the second linear direction (e.g., left) along the first axis 110A. The second power stroke and the first exhaust stroke are performed concurrently. The tensile force of the first piston 108A moving in the second linear direction (e.g., left) is received in responsive to the second power stroke by the tensile band 111 affixed to a second end 109B of the first piston 108A.

Method 500 continues at block 525, where engine system 100 performs a first intake stroke by moving the first piston 108A fitted within the first cylinder 107A in the first linear direction (e.g., right) along the first axis 110A. At block 530, engine system 100 performs a second exhaust stroke by moving the first piston 108A fitted within the first cylinder 107A in the first linear direction (e.g., right) along the first axis 110A. The first intake stroke and the second exhaust stroke are performed concurrently.

Method 500 continues at block 535, where engine system 100 performs a second compression stroke by moving the first piston 108A fitted within the first cylinder 107A in the second linear direction (e.g., left) along the first axis 110A. At block 540, engine system 100 performs a second intake stroke by moving the first piston 108A fitted within the first cylinder 107A in the second linear direction (e.g., left) along the first axis 110A. The second compression stroke and the second intake stroke are performed concurrently.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events.

Figure 6A:
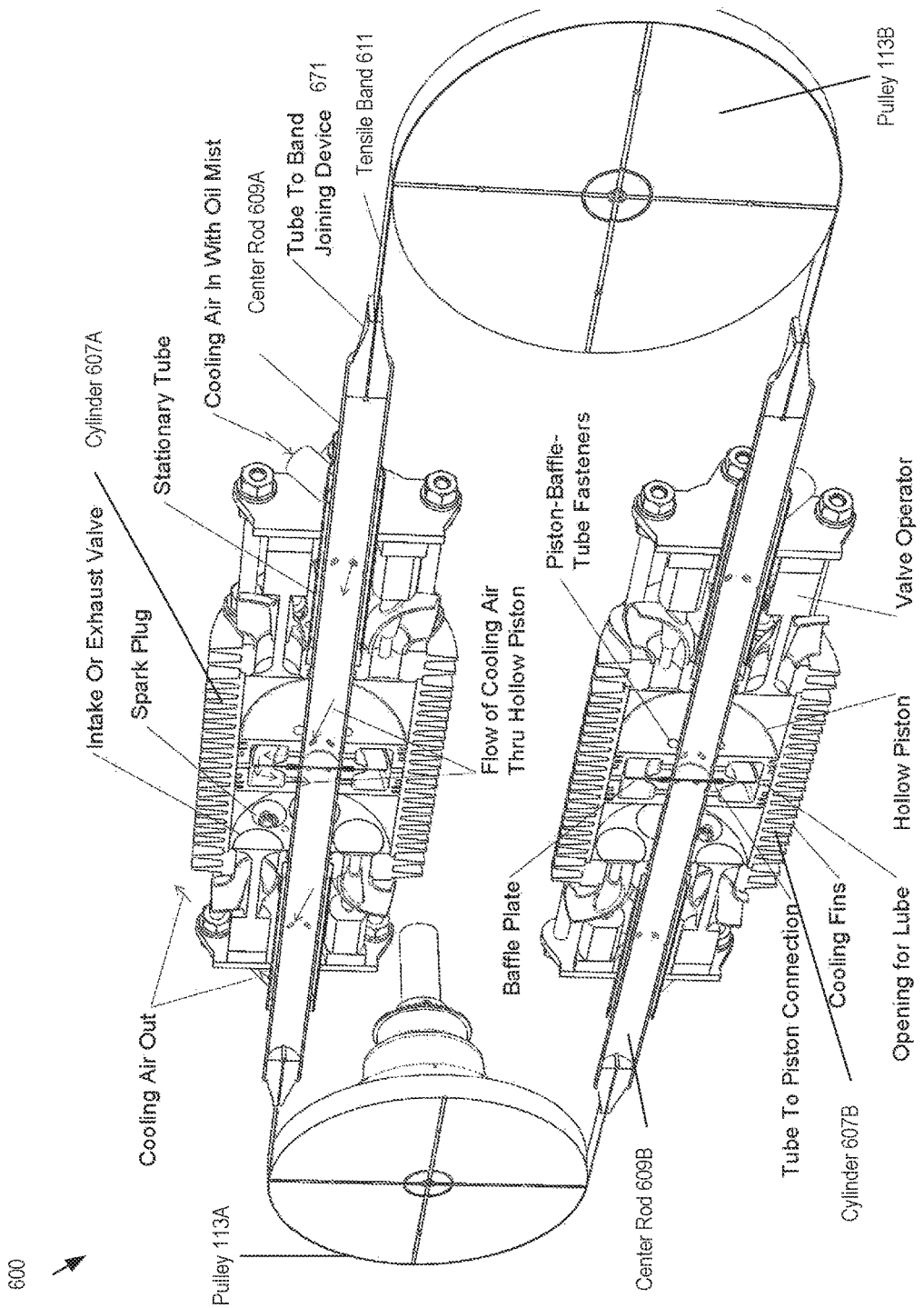
FIG. 6A illustrates a cross section of a tethered piston engine, in accordance with some implementations of the disclosure.

FIG. 6A illustrates a cross section of a tethered piston engine, in accordance with some implementations of the disclosure. It may be noted that tethered piston engine 600 may include elements described with respect to FIG. 1. Tethered piston engine 600 includes cylinder 607A and cylinder 607B that have ridged members (also referred to as "cooling fins" herein) to serve as a heat sink to accelerate the removal of heat from the cylinder 607A and cylinder 607B. At least part of center rod 609A and center rod 609B may reciprocate within cylinder 607A and cylinder 607B, respectively. In one implementation, tensile band 611 may be connected to center rod 609A and 609B using a joining device 671.

FIG. 6B illustrates magnified view of a cross section of a tethered piston engine, in accordance with some implementations of the disclosure. Tethered piston engine 650 shows a magnified view of cylinder 607A of tethered piston engine 600 described with respect to FIG. 6A. Center rod 609A may be hollowed and connected through piston 608. Piston 608 may also be hollowed. The arrows pointing in center rod 609A and piston 608 illustrate a material may flow through the aforementioned. For example a cooling air or oil may be pressurized to flow through the center rod 609A and piston 608 to cool the aforementioned elements.

Figure 7:
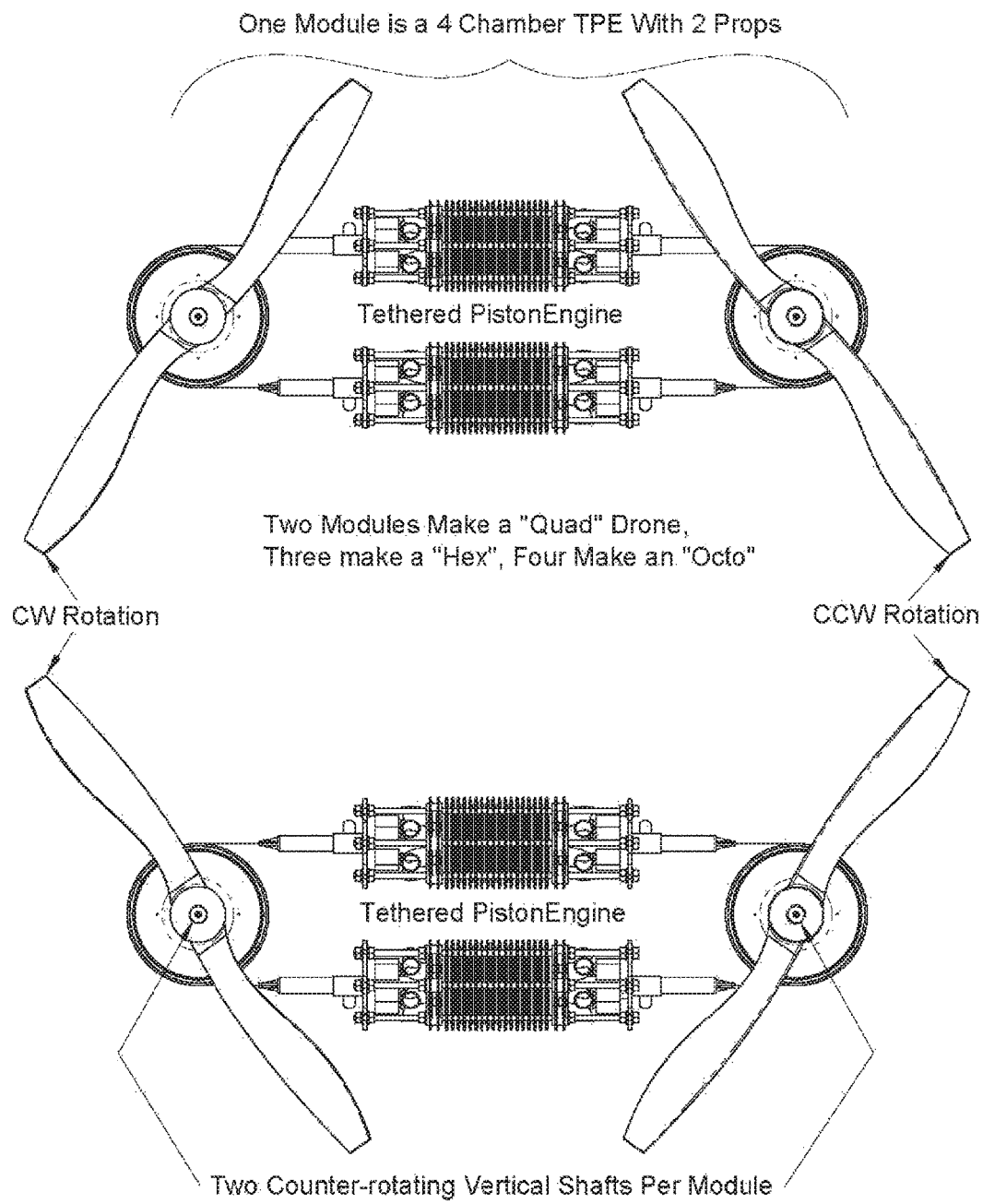
FIG. 7 illustrates an apparatus using a tethered piston engine, in accordance with some implementations of the disclosure.

FIG. 7 illustrates an apparatus using a tethered piston engine, in accordance with some implementations of the disclosure. Apparatus 700 (also referred to as a "drone" herein) may implement one or more modules. A module may include two or more cylinders, were the tether is connected to two propellers to allow lift. It may be appreciated that two modules may be included in a quad drone, and three modules may be included in a hex drone, and so forth. The two propellers of the module may rotate in opposite directions, where one propeller rotates in a clockwise direction and another propeller rotates in a counterclockwise direction. The propellers may be configured to provide lift while rotating in opposite directions.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A system comprising:
an internal combustion engine comprising:
a first cylinder orientated along a first axis, the first cylinder comprising a first end and a second end;
a first piston, fitted within the first cylinder, to move in reciprocating motion by alternately moving in a first linear direction along the first axis towards the first end of the first cylinder responsive to a first power stroke comprising a first combustion event in the first cylinder with respect to a first side of the first piston and in a second linear direction along the first axis towards the second end of the first cylinder responsive to a second power stroke comprising a second combustion event in the first cylinder with respect to a second side of the first piston;
a second cylinder orientated along a second axis that is parallel the first axis, wherein a second piston is fitted within the second cylinder;
a first pulley comprising a first internal face, a second internal face, and a first external face of the first pulley, wherein the first pulley is located adjacent the first end of the first cylinder and in a first plane that intersects the first axis and the second axis, wherein the first internal face and the second internal face of the first pulley are parallel the first plane;
a second pulley comprising a third internal face, a fourth internal face, and a second external face of the first pulley, wherein the second pulley is located adjacent the second end of the first cylinder an in the first plane, wherein the third internal face and the fourth internal face of the second pulley are parallel the first plane;
a tensile band comprising a first portion and a second portion, wherein the first portion of the tensile band is affixed to a first end of the first piston and a third end of the second piston, wherein the first portion of the tensile band contacts the first external face of the first pulley, wherein the second portion of the tensile band is affixed to a second end of the first piston and a fourth end of the second piston, wherein the second portion of the tensile band contacts the second external face of the second pulley, wherein the first piston is to exert a first tensile force on the second portion of the tensile band in the first linear direction in response to the first power stroke, and wherein the first piston is to exert a second tensile force on the first portion of the tensile band in the second linear direction in response to the second power stroke;
a first clutch comprising a first clutch disc and a second clutch disc; and
a second clutch comprising a third clutch disc and a fourth clutch disc.

2. The system of claim 1, the internal combustion engine further comprising:
the second piston to move in the reciprocating motion by alternately moving in a third linear direction along the second axis responsive to a third power stroke and a fourth linear direction along the second axis responsive to a fourth power stroke, wherein the second piston is to exert a third tensile force on the first portion of the tensile band in the third linear direction in response to the third power stroke, and wherein the second piston is to exert a fourth tensile force on the second portion of the tensile band in the fourth linear direction in response to the fourth power stroke.

3. The system of claim 1, further comprising
a pulley subsystem comprising the first pulley and the second pulley, the pulley subsystem to translate, using the tensile band, the reciprocating motion of the first piston to rotary motion.

4. The system of claim 1, further comprising:
the first pulley to rotate around a first rotational axis; and
the second pulley to rotate around a second rotational axis, wherein the first pulley and the second pulley to hold the tensile band in a loop under tension, wherein the first rotational axis and the second rotational axis are perpendicular to the first plane.

5. The system of claim 1, further comprising a clutch subsystem comprising:
the first clutch comprising the first clutch disc and the second clutch disc, wherein the first clutch disc is adjacent to the first internal face of the first pulley, wherein the second clutch disc is adjacent to the second internal face of the first pulley, wherein the first clutch is orientated on a first rotational axis; and
the second clutch comprising the third clutch disc and the fourth clutch disc, wherein the third clutch disc is adjacent the third internal face of the second pulley, wherein the fourth clutch disc is adjacent the fourth internal face of the second pulley, wherein the second clutch is orientated on a second rotational axis, wherein the first clutch and the second clutch to alternately couple the first pulley to a first shaft in view of the first power stroke and the second pulley to a second shaft in view of the second power stroke.

6. The system of claim 5, wherein the clutch subsystem comprises:
a first pneumatic actuated clutch to couple to the first pulley, wherein the first pneumatic clutch is the first clutch; and
a second pneumatic actuated clutch to couple to the second pulley, wherein the second pneumatic clutch is the second clutch, wherein the first pneumatic actuated clutch and the second pneumatic actuated clutch use pressurized gas to alternately engage or disengage the first pulley or the second pulley respectively, wherein the pressurized gas is associated with combustion gasses of combustion events of the first cylinder.

7. The system of claim 5, wherein the clutch subsystem further to alternately engage the first pulley of a pulley subsystem with the first shaft by coupling first clutch disc and the second clutch disc with the first internal face and the second internal face of the first pulley respectively and disengage the second pulley of the pulley subsystem from the second shaft by separating the third clutch disc and the fourth clutch disc with the third internal face and the fourth internal face of the second pulley respectively by an air gap, or to disengage the first pulley from the first shaft and engage the second pulley with the second shaft.

8. The system of claim 3, further comprising:
a transmission, operatively coupled to the pulley subsystem, to translate the rotary motion in a clockwise direction and the rotary motion in a counter clockwise direction to rotary motion in a single direction about a first rotational axis.

9. The system of claim 8, further comprising
a flywheel, operatively coupled to the transmission, to rotate in the single direction about the first rotational axis.

10. The system of claim 1, further comprising
a control subsystem to control the internal combustion engine to operate intermittently.

11. The system of claim 1, wherein a first angle formed between the tensile band and a radial arm of a first pulley is maintained at substantially ninety degrees during the first power stroke.

12. The system of claim 1, wherein movement of the first piston in the first linear direction along the first axis responsive to the first power stroke compresses fuel at the second end of the first piston to perform a compression stroke.

13. An apparatus comprising:
- a first cylinder of an internal combustion engine orientated along a first axis, the first cylinder comprising a first end and a second end;
- a first piston, fitted within the first cylinder, to move in reciprocating motion by alternately moving in a first linear direction along the first axis toward the first end of the first cylinder responsive to a first power stroke comprising a first combustion event in the first cylinder with respect to a first side of the first piston and in a second linear direction along the first axis toward the second end of the first cylinder responsive to a second power stroke comprising a second combustion event in the first cylinder with respect to a second side of the first piston;
- a second cylinder orientated along a second axis that is parallel the first axis, wherein a second piston is fitted within the second cylinder;
- a first pulley comprising a first internal face, a second internal face, and a first external face of the first pulley, wherein the first pulley is located adjacent the first end of the first cylinder and in a first plane that intersects the first axis and the second axis, wherein the first internal face and the second internal face of the first pulley are parallel the first plane;
- a second pulley comprising a third internal face, a fourth internal face, and a second external face of the first pulley, wherein the second pulley is located adjacent the second end of the first cylinder an in the first plane, wherein the third internal face and the fourth internal face of the second pulley are parallel the first plane;
- a tensile band comprising a first portion and a second portion, wherein the first portion of the tensile band is affixed to a first end of the first piston and a third end of the second piston, wherein the first portion of the tensile band contacts the first external face of the first pulley, wherein the second portion of the tensile band is affixed to a second end of the first piston and a fourth end of the second piston, wherein the second portion of the tensile band contacts the second external face of the second pulley, wherein the first piston is to exert a first tensile force on the second portion of the tensile band in the first linear direction in response to the first power stroke, and wherein the first piston is to exert a second tensile force on the first portion of the tensile band in the second linear direction in response to the second power stroke;
- a first clutch comprising a first clutch disc and a second clutch disc; and
- a second clutch comprising a third clutch disc and a fourth clutch disc.

14. The apparatus of claim 13, further comprising:
the second piston to move in the reciprocating motion by alternately moving in a third linear direction along the second axis responsive to a third power stroke or a fourth linear direction along the second axis responsive to a fourth power stroke, wherein the second piston is to exert a third tensile force on the first portion of the tensile band in the third linear direction in response to the third power stroke, and wherein the second piston is to exert a fourth tensile force on the second portion of the tensile band in the fourth linear direction in response to the fourth power stroke.

15. The apparatus of claim 13, further comprising:
the first pulley to rotate around a first rotational axis; and
the second pulley to rotate around a second rotational axis, wherein the first pulley and the second pulley to hold the tensile band in a loop under tension, wherein the first rotational axis and the second rotational axis are perpendicular to the first axis and a second axis.

16. The apparatus of claim 13, wherein movement of the first piston in the first linear direction along the first axis responsive to the first power stroke compresses a material at the second end of the first piston to perform a compression stroke.

* * * * *